United States Patent
Chandler et al.

(10) Patent No.: US 11,692,783 B2
(45) Date of Patent: Jul. 4, 2023

(54) FIREARM SAFETY MECHANISMS, VISUAL SAFETY INDICATORS, AND RELATED TECHNIQUES

(71) Applicant: LodeStar Firearms, Inc., Radnor, PA (US)

(72) Inventors: Virginia Chandler, Chattanooga, TN (US); Robert Eugeniusz Regent, Boise, ID (US); Katie Louise Schuelke, Boise, ID (US); Michael James Witt, Boise, ID (US); John Patrick Fitzgerald, Meridian, ID (US)

(73) Assignee: LodeStar Firearms, Inc., Radnor, PA (US)

( * ) Notice: Subject to any disclaimer, the term of this patent is extended or adjusted under 35 U.S.C. 154(b) by 0 days.

(21) Appl. No.: 17/978,124

(22) Filed: Oct. 31, 2022

(65) Prior Publication Data
US 2023/0077252 A1    Mar. 9, 2023

Related U.S. Application Data

(63) Continuation-in-part of application No. 17/023,831, filed on Sep. 17, 2020.
(Continued)

(51) Int. Cl.
*F41A 17/06* (2006.01)
*H02J 50/10* (2016.01)

(52) U.S. Cl.
CPC .............. *F41A 17/06* (2013.01); *H02J 50/10* (2016.02); *F41A 17/063* (2013.01); *F41A 17/066* (2013.01)

(58) Field of Classification Search
CPC .......... F41A 17/02; F41A 17/46; F41A 17/06; F41A 17/063; F41A 17/066
See application file for complete search history.

(56) References Cited

U.S. PATENT DOCUMENTS 3,258,871 A * 7/1966 Green ..................... F41A 17/46
  42/70.06
4,457,091 A * 7/1984 Wallerstein ............. F41A 17/04
  42/70.11
(Continued)

FOREIGN PATENT DOCUMENTS

CA    2568329 A1 * 12/2005 ............. F41A 17/06
DE    20013901 U1    6/2001
(Continued)

OTHER PUBLICATIONS

U.S. Appl. No. 17/023,831, filed Sep. 17, 2020, Farrell et al.
(Continued)

*Primary Examiner* — Gabriel J. Klein
(74) *Attorney, Agent, or Firm* — Wolf, Greenfield & Sacks, P.C.

(57) ABSTRACT

The techniques described herein relate to methods and apparatus for firearm safety mechanisms, visual safety indicators, and related techniques. A firearm includes a handle comprising one or more buttons disposed at least partially within a surface of the handle, such that the one or more buttons can be in contact with an operator's hand when the operator grasps the handle; a safety mechanism in mechanical communication with the trigger. The safety mechanism comprises: a first position that blocks actuation of the trigger; and a second position that does not block actuation of the trigger; and at least one processor configured to: upon determining an input code matches a stored code, transmits a signal to the safety mechanism to change the safety mechanism from the first position to the second position so that the firearm can be fired by the operator.

21 Claims, 34 Drawing Sheets

Related U.S. Application Data

(60) Provisional application No. 63/300,677, filed on Jan. 19, 2022, provisional application No. 63/274,209, filed on Nov. 1, 2021, provisional application No. 62/901,899, filed on Sep. 18, 2019.

(56) References Cited

U.S. PATENT DOCUMENTS

| | | | |
|---|---|---|---|
| 4,682,435 A * | 7/1987 | Heltzel | F41A 17/063 42/70.11 |
| 4,970,819 A | 11/1990 | Mayhak | |
| 5,140,766 A * | 8/1992 | Brooks | F41A 17/04 42/70.11 |
| 5,361,525 A * | 11/1994 | Bowes | F41A 17/02 42/70.11 |
| 5,758,524 A * | 6/1998 | Yu | F41A 17/06 70/276 |
| 6,286,240 B1 | 9/2001 | Collins | |
| 6,301,815 B1 | 10/2001 | Sliwa | |
| 6,442,880 B1 * | 9/2002 | Allan | F41A 17/066 42/70.11 |
| 6,510,639 B2 * | 1/2003 | McMoore | F41A 17/38 42/70.11 |
| 6,642,880 B1 | 11/2003 | Edmonds | |
| 6,861,944 B1 * | 3/2005 | Hoepelman | A43B 3/34 235/382 |
| 8,037,632 B2 | 10/2011 | Pikielny | |
| 8,205,372 B2 * | 6/2012 | Anzeloni | F41C 33/029 42/70.01 |
| 8,762,734 B2 | 6/2014 | Kaufman | |
| 9,341,424 B2 * | 5/2016 | Allan | F41A 17/06 |
| 9,354,010 B1 * | 5/2016 | McCulloch | F41A 17/06 |
| 9,841,249 B1 * | 12/2017 | Nicks | H02J 7/0045 |
| 2001/0032405 A1 * | 10/2001 | Kaminski | F41A 17/08 42/70.05 |
| 2001/0042332 A1 * | 11/2001 | Gering | F41A 17/063 42/70.08 |
| 2004/0031180 A1 | 2/2004 | Ivanov | |
| 2004/0099134 A1 | 5/2004 | Gotfried | |
| 2005/0115130 A1 * | 6/2005 | Glock | F41A 17/02 42/70.06 |
| 2006/0242879 A1 | 11/2006 | Schmitter | |
| 2007/0074438 A1 | 4/2007 | Parhofer et al. | |
| 2007/0209267 A1 | 9/2007 | Do Amarante et al. | |
| 2011/0061280 A1 * | 3/2011 | Emde | F41A 17/063 42/70.01 |
| 2011/0271574 A1 * | 11/2011 | Chang | F41A 17/066 42/70.08 |
| 2012/0011756 A1 | 1/2012 | Albano Do Amarante et al. | |
| 2013/0125441 A1 | 5/2013 | Westwood et al. | |
| 2014/0230300 A1 | 8/2014 | Haq | |
| 2014/0366419 A1 * | 12/2014 | Allan | F41A 17/06 42/70.11 |
| 2017/0299301 A1 | 10/2017 | Gant et al. | |
| 2018/0142977 A1 * | 5/2018 | Kloepfer | F41A 17/066 |
| 2020/0170220 A1 | 6/2020 | Zhang | |
| 2021/0180899 A1 | 6/2021 | Farrell et al. | |
| 2022/0412682 A1 * | 12/2022 | Delgado Acarreta | F41A 17/06 |

FOREIGN PATENT DOCUMENTS

| | | | |
|---|---|---|---|
| EP | 1184814 A1 | 3/2002 | |
| FR | 2688301 A1 | 9/1993 | |
| RU | 2203465 C2 * | 4/2003 | F41A 17/06 |

OTHER PUBLICATIONS

U.S. Appl. No. 17/978,114, filed Oct. 31, 2022, Chandler et al.
U.S. Appl. No. 17/978,132, filed Oct. 31, 2022, Chandler et al.
U.S. Appl. No. 17/978,142, filed Oct. 31, 2022, Chandler et al.

* cited by examiner

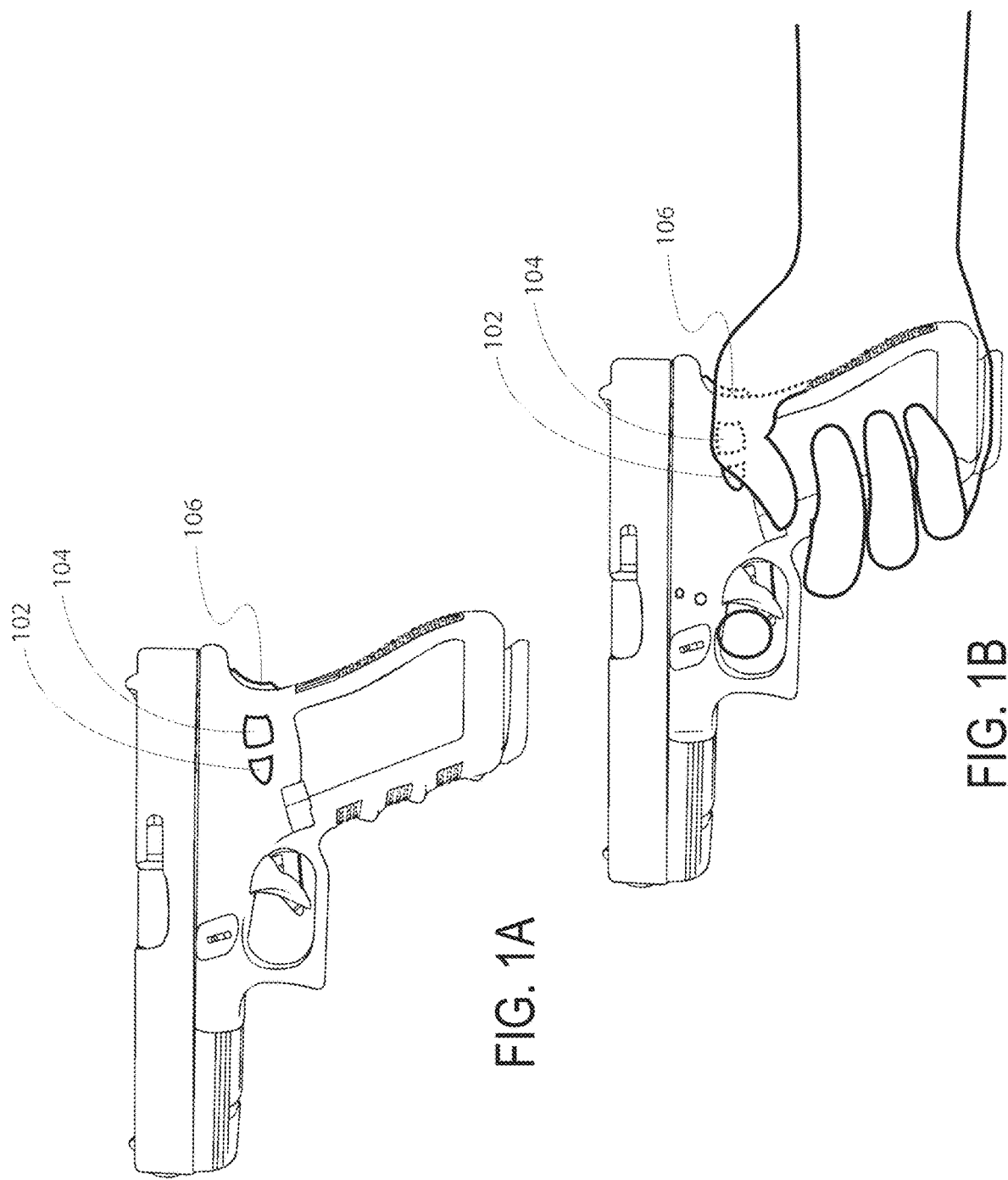

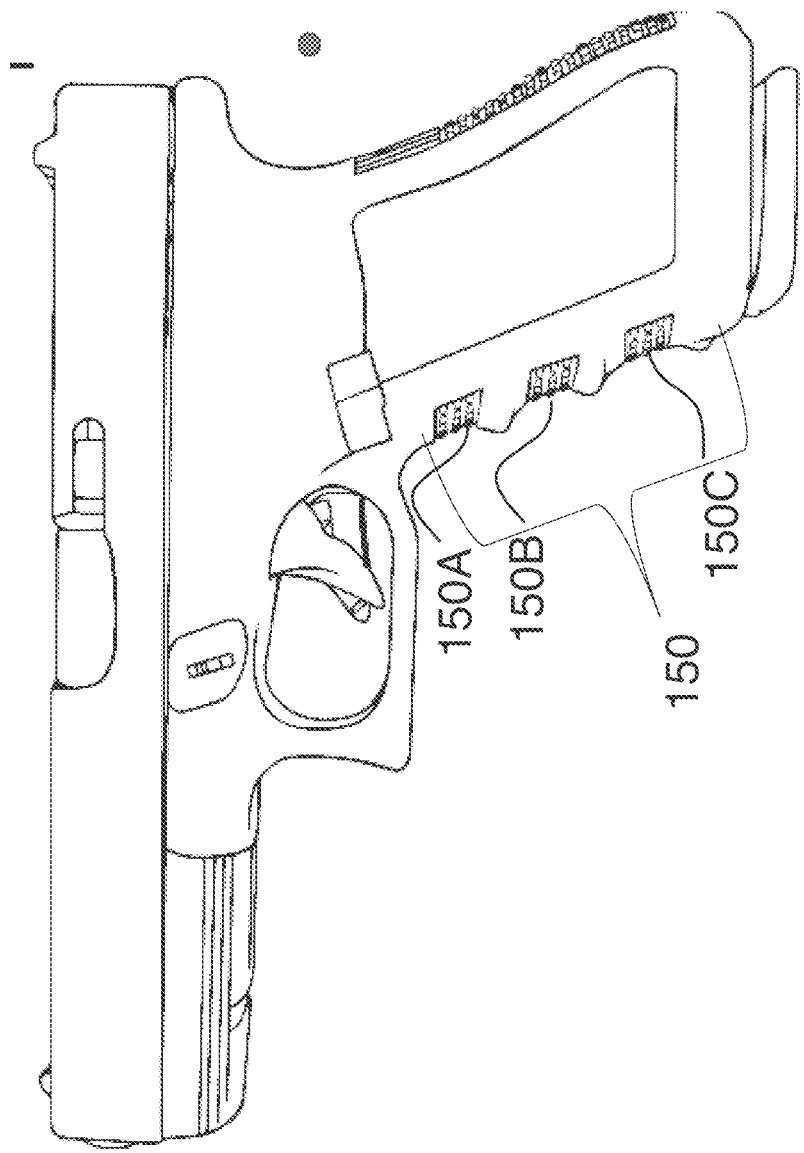

FIREARM SAFETY MECHANISMS, VISUAL SAFETY INDICATORS, AND RELATED TECHNIQUES

RELATED APPLICATIONS

This application is a continuation-in-part under 35 U.S.C. § 120 of U.S. application Ser. No. 17/023,831, filed Sep. 17, 2020, entitled "Firearm Safety Mechanisms, Visual Safety Indicators, and Related Techniques," which claims priority under 35 U.S.C. § 119(e) to U.S. Provisional Application Ser. No. 62/901,899, filed Sep. 18, 2019, entitled "Firearm Safety Mechanisms, Visual Safety Indicators, and Related Techniques," the contents of each of which is herein incorporated by reference in its entirety. This application also claims priority under 35 U.S.C. § 119(e) to U.S. Provisional Application Ser. No. 63/274,209, filed Nov. 1, 2021, entitled "Firearm Safety Mechanisms, Visual Safety Indicators, and Related Techniques," and U.S. Provisional Application Ser. No. 63/300,677, filed Jan. 19, 2022, entitled "Firearm Safety Mechanisms, Visual Safety Indicators, and Related Techniques," the contents of each of which is herein incorporated by reference in its entirety.

TECHNICAL FIELD

The techniques described herein are generally related to firearm safety mechanisms, visual safety indicators, and related firearm techniques. More specifically, the techniques provide for electronically controlled, mechanically operated grip safety mechanisms. The techniques also provide for visual indicators, such as laser sites, that can be used to indicate when a firearm can be fired and/or to indicate other aspects of the firearm (including the user's interaction with the firearm).

BACKGROUND

Generally, a firearm is a device that is designed to expel a projectile (e.g., a bullet) through the barrel of the firearm upon action of an explosive (e.g., gunpowder within a casing of a cartridge that also holds the bullet). Firearms often include a trigger configured to actuate a firing pin to strike a fuse of the cartridge to action the explosive, which causes the bullet to be expelled through the barrel of the firearm. Such interaction of the firing pin to the fuse is often controlled by depressing the trigger. Firearms can include one or more safety mechanisms designed to prevent intentional and/or unintentional firing (e.g., by locking the trigger and/or preventing the firing pin from contacting the fuse). For example, some firearms include a grip safety comprised of a single back-strap that is located along the back portion of the firearm grip. Such grip safeties can be designed to require a firearm operator to depress the back-strap safety while engaging the trigger in order to fire the firearm. Otherwise, if the trigger is engaged without depressing the back-strap safety, the firearm will not fire. Such safeties can be designed to require a certain hand size and/or hand strength, which can limit the ability of most children to fire the weapon. However, such safeties are typically purely mechanical safeties that cannot prevent unauthorized adult use.

Another example of a firearm safety is an external mechanical safety switch that has two or three positions (e.g., safe mode and semi-auto mode, or safe mode, semi-auto mode, and auto mode). Such safeties can be operated by both children and adults, and therefore cannot be used to limit use to just adults that are authorized to use the firearm. Further, such safeties can be cumbersome to use and can fail to provide quick and safe firearm use in situations, such as emergency situations. For example, a user may raise the weapon to a target without disengaging the safety. As another example, a user may properly deactivate the safety when raising the weapon to a target, but fail to activate the safety when lowering the weapon from the target, such that the firearm unintentionally remains in use.

SUMMARY OF INVENTION

Some embodiments relate to a firearm. The firearm includes a handle comprising one or more buttons disposed at least partially within a surface of the handle, such that the one or more buttons can be in contact with an operator's hand when the operator grasps the handle. The firearm includes a trigger that is actuatable to fire the firearm. The firearm includes a safety mechanism in mechanical communication with the trigger, wherein the safety mechanism comprises: a first position that blocks actuation of the trigger; and a second position that does not block actuation of the trigger. The firearm includes at least one processor in electrical communication with the safety mechanism, the one or more sensors, and a memory storing computer-readable instructions that, when executed by the at least one processor, cause the at least one processor to: receive input data from the one or more buttons indicative of an input code; determine whether the input code matches a stored code; and upon determining the input code matches the stored code, transmitting a signal to the safety mechanism to change the safety mechanism from the first position to the second position so that the firearm can be fired by the operator.

According to some embodiments, a firearm is provided. The firearm comprises: a handle comprising one or more buttons disposed at least partially within a surface of the handle, such that the one or more buttons can be accessed by an operator's hand when the operator grasps the handle; a trigger that is actuatable to fire the firearm; a safety mechanism in mechanical communication with the trigger, wherein the safety mechanism comprises:
a first position that blocks actuation of the trigger; and a second position that does not block actuation of the trigger; and at least one processor in electrical communication with the safety mechanism, the one or more sensors, and a memory storing computer-readable instructions that, when executed by the at least one processor, cause the at least one processor to: receive input data from the one or more buttons indicative of an input code; determine whether the input code matches a stored code; and upon determining the input code matches the stored code, transmitting a signal to the safety mechanism to change the safety mechanism from the first position to the second position so that the firearm can be fired by the operator.

According to some embodiments, a computerized method for controlling operation of a firearm is provided. The method comprises: using at least one processor to perform: receiving data from one or more buttons disposed at least partially within a surface of a handle of the firearm, wherein the data is indicative of an input code provided by a series of presses of the one or more buttons by an operator over an input time period; determining whether the input code matches a stored code; and upon determining the input code matches the stored code, transmitting a signal to a safety mechanism to change the safety mechanism from (a) a first position that blocks actuation of a trigger that is actuatable to fire the firearm to (b) a second position that does not block actuation of the trigger, so that the firearm can be fired by the operator.

According to some embodiments, a non-transitory computer-readable storage medium storing instructions is provided. The instructions, when executed by at least one processor, cause the at least one processor to perform: receiving data from one or more buttons disposed at least partially within a surface of a handle of the firearm, wherein the data is indicative of an input code provided by a series of presses of the one or more buttons by an operator over an input time period; determining whether the input code matches a stored code; and upon determining the input code matches the stored code, transmitting a signal to a safety mechanism to change the safety mechanism from (a) a first position that blocks actuation of a trigger that is actuatable to fire the firearm to (b) a second position that does not block actuation of the trigger, so that the firearm can be fired by the operator.

According to some embodiments, an electronically controlled mechanically operated (ECMO) firearm safety system embedded inside a firearm is provided. The system comprises: a cam; a motor mechanically coupled to the cam, the motor configured to rotate the cam; and a trigger bar stop having a first position in which the trigger bar stop prevents firing of the firearm and a second position in which the trigger bar stop allows discharging of the firearm; wherein the cam is configured to move the trigger bar stop between the first position and the second position.

According to some embodiments, a firearm is provided. The firearm comprises: a trigger bar configured to move in a first direction to trigger discharging of the firearm; a cam; a motor mechanically coupled to the cam; and a trigger bar stop having a first position in which the trigger bar stop prevents discharging of the firearm and a second position in which the trigger bar stop allows firing of the firearm.

According to some embodiments, a safety system embedded inside a firearm is provided. The safety system comprises: a safety mechanism having a locked position that prevents discharging of the firearm and an unlocked position that permits discharging of the firearm; a wireless communication circuit configured to communicate with at least one device; a processor configured to: receive, through the wireless communication circuit from the at least one device, an unlock signal; and cause the safety mechanism to change from the locked position to the unlocked position in response to receiving the unlock signal.

According to some embodiments, a mobile device for communication with a safety system embedded inside a firearm is provided. The safety system is configured to lock the firearm to prevent firing of the firearm and unlock the firearm to allow discharging of the firearm. The mobile device comprising: a wireless communication circuit; and a processor configured to: receive, through an input interface of the mobile device, authentication information from a user of the mobile device; determine, based on the authentication information, whether the user has permission to discharge the firearm; and transmit, using the wireless communication circuit to the safety system, a signal that causes the safety system to unlock the firearm to allow discharging of the firearm when it is determined that the user has permission to discharge the firearm.

According to some embodiments, a charging station configured to charge at least one safety system embedded inside at least one firearm is provided. The at least one safety system is configured to lock the at least one firearm to prevent discharging of the at least one firearm and unlock the at least one firearm to allow discharging of the at least one firearm. The charger station comprising: at least one dock for placement of the at least one fire firearm; at least one electrical contact configured to make an electrical connection with at least one charging element of the at least one safety system; and at least one electrical charging circuit configured to transmit electricity to the at least one safety system when the at least one electrical contact makes an electrical connection with the at least one charging element of the at least one firearm.

According to some embodiments, a safety system embedded inside a firearm is provided. The safety system comprises: a safety mechanism having a locked position that prevents discharging of the firearm and an unlocked position that allows discharging of the firearm; a fingerprint sensor located on an outer surface of the firearm, the fingerprint sensor configured to generate a fingerprint scan of a finger contacting the fingerprint sensor; a light source located proximate the fingerprint sensor; and an electrical circuit configured to: cause the safety mechanism to change between the locked position and the unlocked position in response to receiving the first signal from the fingerprint sensor indicating detection of the fingerprint of the user permitted to use the firearm.

There has thus been outlined, rather broadly, the features of the disclosed subject matter in order that the detailed description thereof that follows may be better understood, and in order that the present contribution to the art may be better appreciated. There are, of course, additional features of the disclosed subject matter that will be described hereinafter and which will form the subject matter of the claims appended hereto. It is to be understood that the phraseology and terminology employed herein are for the purpose of description and should not be regarded as limiting.

BRIEF DESCRIPTION OF FIGURES

Various objectives, features, and advantages of the disclosed subject matter can be more fully appreciated with reference to the following detailed description of the disclosed subject matter when considered in connection with the following drawings, in which like reference numerals identify like elements.

FIGS. 1A-1B is a diagram of a firearm with an example of an electrically controlled, mechanically operated safety, according to some embodiments;

FIG. 1C is a diagram showing other exemplary locations for a set of sensors to allow the user to program the sensors for locking and/or unlocking the firing mechanism, according to some embodiments.

DETAILED DESCRIPTION

Figure 1D:
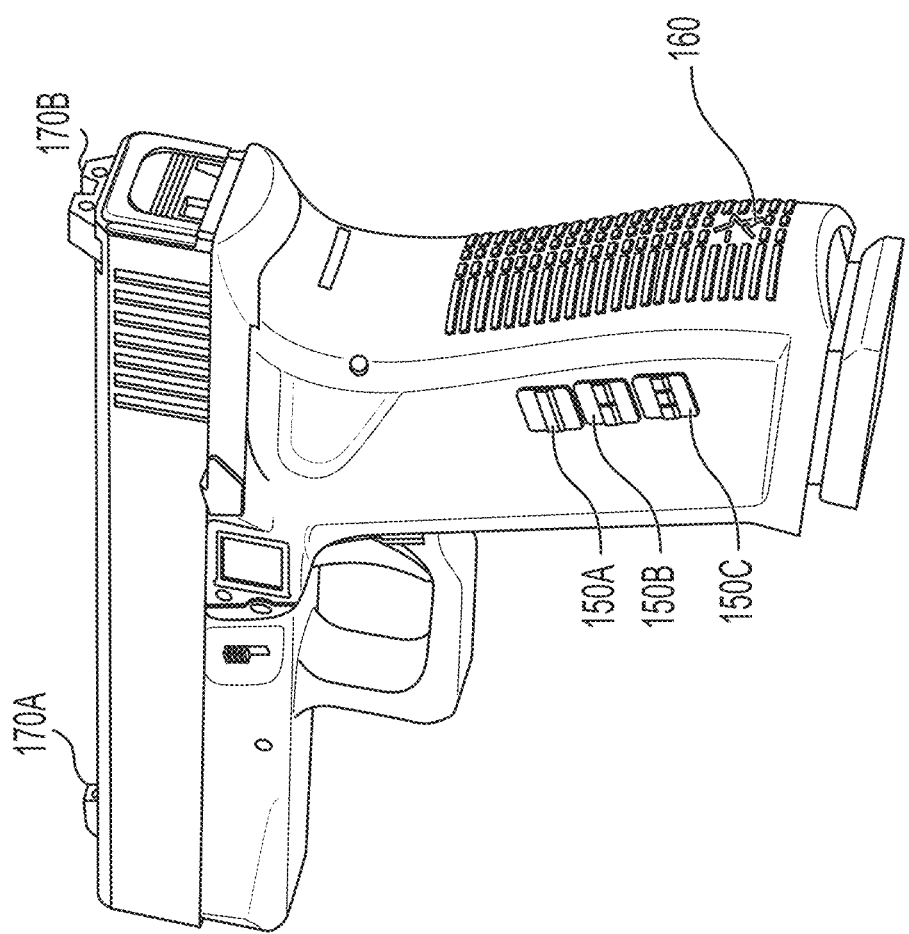
FIGS. 1D-1F are diagrams showing further exemplary locations for a set of sensors to allow the user to use a pin pad feature for locking and/or unlocking the firing mechanism, according to some embodiments.

The techniques described herein provide for electronically controlled, mechanically operated (ECMO) firearm safeties. Generally, one or more safety components can be used to control use of the firearm. In some embodiments, the ECMO safety system can include a mechanical safety component, such as mechanical components internal to the firearm, a back-strap safety and/or other type of mechanical safety component (e.g., a set of pressure sensors incorporated into the firearm grip, a set of pin pad sensors, etc.). The ECMO safety system can additionally or alternatively include electronic components (e.g., within the housing of the firearm) that are used to authenticate a user to use the firearm. The ECMO safety system can include a visual indicator on the firearm and/or a visual indicator on a target, such as a colored laser site, a colored dot (e.g., a red dot site, green dot site, etc.), a reflex site, and/or the like to visually indicate the state of the firearm (e.g., locked, unlocked, etc.). The ECMO safety system can include a battery to power the electronics (e.g., also within the housing of the firearm). The ECMO safety system can include a recharging component to recharge the battery, which can include a port on the outside of the firearm for connecting the firearm to a recharging station. The ECOM safety system can include an electrical motor and associated mechanical components that are used to mechanically unlock and lock the firearm. The firearm can further include onboard diagnostic and usage data, which can be used to provide a black box of firearm usage data for subsequent collection and/or analysis.

In operation, a user can authenticate the firearm to enable use of the firearm. In some embodiments, the user can authenticate the firearm to enable an additional safety component. For example, the user can authenticate the firearm to enable a grip safety, and then depress the grip safety to enable the trigger to be depressed. In some embodiments, a user may be required to perform multiple different authentications in order to enable use of the firearm. The user may be required to perform any combination of authentications described herein. For example, the user may be required to authenticate with a pin pad and a biometric sensor (e.g., fingerprint sensor) to enable use of the firearm. As another example, the user may be required to authenticate using a mobile device and a pin pad. As another example, the user may be required to authenticate using a mobile device and a biometric sensor. As another example, the user may be required to authenticate using a mobile device, a pin pad, and a biometric sensor. In some embodiments, the user can use a computer application (e.g., a mobile application running on a smartphone) to configure which authentication technique(s) are required to unlock the firearm. As a result, the firearm can receive (e.g., via a wireless communication circuit) from the application a configuration signal indicative of whether to use the pin pad on the firearm, the biometric sensor on the firearm, the computer application, and/or or any combination thereof, to unlock the firearm. In response to the configuration signal, the firearm (e.g., via a processor) can configure the firearm accordingly so that the safety mechanism is not changed from the locked position to the unlocked position until the appropriate authentication technique(s) are completed.

Once a user has sufficiently authenticated the firearm, the firearm actuates an electronic motor that causes the firearm to mechanically unlock so that the firearm can be fired by the user. After completion of use of the firearm, the electronic motor can actuate again to cause the firearm to mechanically lock to prevent firing.

In some embodiments, the ECMO safety can provide various advantages, including providing firearm safety measures that are achieved by requiring appropriate user authentication prior to allowing use of the firearm. In some embodiments, the ECMO safety can be configured to work in conjunction with various authentication processes (e.g., pin codes, biometric sensors, wireless (e.g., Bluetooth, RFID), etc.) to actuate the ECMO safety. For example, whether using a pin code, active/passive token pairing, biometric authentication, and/or other authentication techniques, the authentication process can be used as a step that must be completed in order to render the firearm usable. For example, even if a mechanical portion of the safety is activated (e.g., such as by depressing a back strap, applying sufficient pressure to the ECMO sensors, entering a pin code, and/or the like), the firearm is not usable until completion of an electronic authentication or pairing process between the user and the firearm (e.g., via a mobile application). Thus, the pairing process provides an authentication step that is not available with conventional mechanical safeties. Accordingly, the techniques described herein can use one or more authentication techniques, including pin codes, pressure sensing, biometric authentication, pairing, and/or some combination thereof, in order to provide a robust safety mechanism for firearms.

In some embodiments, the ECMO safety can be configured for use with conventional firearms lacking any authentication features. For example, the ECMO safety can be deployed in rifle-style firearms, such as AR-15 rifles, pistols, and/or other types of firearms that conventionally only include mechanical safeties. Rifle-style firearms, for example, often include an external mechanical safety with two or three positions. Rifles often include such safeties because they are sling carried, and therefore do not have a holster (e.g., like with pistols) or other mechanism to cover the trigger to protect the trigger from inadvertent actuation. The ECMO grip safety techniques described herein can be used in conjunction with, or in place of, such an external safety. Use of such a grip safety can, for example, make training for such firearms much safer and simpler compared to using just an external safety.

Another exemplary advantage provided by the ECMO safety is that users can configure an activation time period such that, once activated, the firearm remains in an authenticated state and does not require re-authentication until after the authentication time period. For example, a user can authenticate the firearm to enable the grip safety. Once authentication is complete, as described herein the user can depress the safety (e.g., either by pressure or by mechanical operation) to enable the trigger to be depressed. Once authenticated and operated, the firearm can remain in an active state for the activation time period, such that the user can simply fire the firearm without needing to re-authenticate the firearm and/or to mechanically actuate the safety again. For example, for a safety with a mechanical component actuated when the user grabs the grip of the firearm, if the user removes his or her hand from the firearm, the safety can be configured to maintain the firearm in an active ready state for the activation time period (e.g., which can be pre-configured and/or determined by the user).

Additionally or alternatively, the techniques can provide for one or more visual indicators to indicate a locked state of the firearm. Some firearms can include a light (e.g., a LED light) or other indicator on the firearm to indicate a status of the firearm. For example, some firearms include a colored light that is visible in the user's field of view, such as a light that is disposed on the slide of a firearm in a position that is visible to the user when aiming the firearm. The light can change color to indicate whether the firearm is not usable (e.g., one color, such as red, green, etc.) or is usable (e.g., another color different than that used to indicate the firearm is useable). For example, if red is used to indicate the firearm is not usable, then green can be used to indicate the firearm is usable. As another example, if green is used to indicate the firearm is not usable, then red can be used to indicate the firearm is usable. However, such lights can be difficult to use, and often require use of replaceable batteries, which can be cumbersome to the user. Accordingly, the techniques can provide for low power indicators, such as LED indicators, sights, lasers, and/or the like, that can leverage a built-in and rechargeable power source of the firearm.

Some embodiments provide a firearm. The firearm may include a handle comprising one or more buttons disposed at least partially within a surface of the handle, such that the one or more buttons can be accessed by an operator's hand when the operator grasps the handle. The firearm may include a trigger that is actuatable to fire the firearm. The firearm may further include a safety mechanism in mechanical communication with the trigger. The safety mechanism may include: (1) a first position that blocks actuation of the trigger; and (2) a second position that does not block actuation of the trigger. The firearm may include a processor in electrical communication with the safety mechanism, the one or more sensors. The processor is configured to: (1) receive input data from the one or more buttons indicative of an input code; (2) determine whether the input code matches a stored code; and (3) upon determining the input code matches the stored code, transmitting a signal to the safety mechanism to change the safety mechanism from the first position to the second position so that the firearm can be fired by the operator.

In some embodiments, the firearm may further include a barrel and a chamber disposed adjacent to the barrel. The chamber may be sized to receive a cartridge. The cartridge may comprise a casing, a bullet disposed at a proximal end of the casing, a fuse disposed at a distal end of the casing, and an explosive disposed within a portion of the casing between the fuse and the bullet, and a firing pin mechanically actuatable by the trigger. Upon actuation, the firing pin is configured to contact the fuse of the cartridge to ignite the explosive and to cause the bullet to be expelled through the barrel.

In some embodiments, the one or more buttons each comprises a tactile button configured to provide an input to the processor when pressed by the operator. The one or more tactile buttons comprise a plurality of tactile buttons, wherein each tactile button is associated with a different code input. In some embodiments, the one or more buttons comprise three buttons. The three buttons may be disposed on a side of a grip of the handle, such that each button is spaced from the other buttons along the side of the grip of the handle such that each button is configured to be accessed by a different finger of the operator's hand when the handle is grasped by the operator. In some embodiments, receiving the input data from the three buttons indicative of the input code comprises receiving a first ordered sequence of inputs from each of at least some of the three buttons as they are actuated by the operator over time.

In some embodiments, the stored code comprises a second ordered sequence indicative of a single, specific combination of inputs from the three buttons. Determining whether the input code matches the stored code comprises determining whether the first ordered sequence matches the second ordered sequence. In some embodiments, the stored code is configurable.

In some embodiments, the safety mechanism comprises an electric motor in communication with the processor, a cam mounted to the electric motor and rotatable by the electric motor, a trigger bar stop, and a trigger bar mechanically coupled to the trigger. Transmitting the signal to the safety mechanism to change the safety mechanism from the first position to the second position so that the firearm can be fired by the operator comprises actuating the electric motor to rotate the cam to cause the trigger bar stop to disengage from the trigger bar to allow actuation of the trigger.

In some embodiments, the at least one processor is configured to: receive usage data of the firearm, diagnostic data associated with the firearm, or some combination thereof; and store the usage data, diagnostic data, or both as stored data, so that the stored data can be retrieved from the firearm. In some embodiments, the at least one processor is configured to activate an indicator to indicate the safety mechanism is in the second position. In some embodiments, the indicator comprises a laser sight, a reflex sight, or some combination thereof.

In some embodiments, a computerized method for controlling the operation of a firearm is provided. The method comprises using at least one processor to receive data from one or more buttons disposed at least partially within a surface of a handle of the firearm. The data is indicative of an input code provided by a series of presses of the one or more buttons by an operator over an input time period. The method includes determining whether the input code matches a stored code, and upon determining the input code matches the stored code, transmitting a signal to a safety mechanism to change the safety mechanism from (a) a first position that blocks actuation of a trigger that is actuatable to fire the firearm to (b) a second position that does not block actuation of the trigger, so that the firearm can be fired by the operator.

In some embodiments, the one or more buttons each comprise a tactile button and receiving the data from the one or more buttons comprises receiving an electrical signal input in response to the operator contacting any of the one or more buttons. In some embodiments, the one or more buttons comprise a plurality of buttons and receiving the data from the one or more buttons comprises receiving an ordered sequence of inputs from each of the plurality of buttons as they are actuated by the operator over time.

In some embodiments, the method comprises receiving usage data of the firearm, diagnostic data associated with the firearm, or some combination thereof. The method further comprises storing the usage data, diagnostic data, or both as stored data in a memory device disposed in the firearm. In some embodiments, the method comprises activating an indicator to indicate the safety mechanism is in the second position.

In some embodiments, a non-transitory computer-readable storage medium storing processor-executable instructions is provided. The instructions, when executed by at least one processor, cause the at least one processor to receive data from one or more buttons disposed at least partially within a surface of a handle of the firearm, wherein the data is indicative of an input code provided by a series of presses of the one or more buttons by an operator over an input time period. The at least one processor determines whether the input code matches a stored code, and upon determining the input code matches the stored code, transmits a signal to a safety mechanism to change the safety mechanism from (a) a first position that blocks actuation of a trigger that is actuatable to fire the firearm to (b) a second position that does not block actuation of the trigger, so that the firearm can be fired by the operator.

In some embodiments, the one or more buttons each comprises a tactile button and receiving the data from the one or more buttons comprises receiving an electrical signal input in response to the operating contacting any of the one or more buttons. In some embodiments, the one or more buttons comprise a plurality of buttons and receiving the data from the one or more buttons comprises receiving an ordered sequence of inputs from each of the plurality of buttons as they are actuated by the operator over time.

Some embodiments provide an electronically controlled mechanically operated (ECMO) firearm safety system embedded inside a firearm is provided. The system comprises a cam and a motor mechanically coupled to the cam. The motor is configured to rotate the cam. The system comprises a trigger bar stop having a first position in which the trigger bar stop prevents firing of the firearm and a second position in which the trigger bar stop allows discharging of the firearm. The cam is configured to move the trigger bar stop between the first position and the second position.

In some embodiments, when the trigger bar stop is in the first position: a portion of the trigger bar stop is engaged with a trigger bar of the firearm and prevents movement of the trigger bar in a lateral direction to trigger discharging of the firearm. In some embodiments, when the trigger bar stop is in the second position: the portion of the trigger bar stop is disengaged from the trigger bar of the firearm allowing the trigger bar to move in the lateral direction to trigger discharging of the firearm.

In some embodiments, the trigger bar stop comprises a pivot point, and the trigger bar stop rotates about the pivot point when changing between the first position and the second position. In some embodiments, rotation of the cam by the motor causes rotation of the trigger bar stop about the pivot point.

In some embodiments, the trigger bar stop comprises a corner. The corner fits within a recess of the cam when the trigger bar stop is in the first position. The corner is outside of the cam the trigger bar stop is in the second position. In some embodiments, the trigger bar stop prevents discharging of the firing arm when the trigger bar stop is in the first position by preventing actuation of a firing pin of the firearm.

In some embodiments, the system comprises a screw that mechanically couples the motor to the cam. In some embodiments, the system comprises a printed circuit board (PCB) electrically coupled to the motor. In some embodiments, the PCB is a flexible PCB. In some embodiments, the PCB may comprise a control circuit configured to control the motor. In some embodiments, the PCB comprises a wireless communication circuit configured to communicate with at least one device.

In some embodiments, the system comprises a battery. The system may further comprise a charging element configured to make an electrical connection with a charger to charge the battery. In some embodiments, the charger comprises an inductive charger, and the charging element comprises an inductive contact configured to make an electrical connection with the inductive charger. In some embodiments, the charging element comprises one or more pins configured to make an electrical connection with one or more electrical contacts of the charger. In some embodiments, the charging element is located on a base of a handle of the firearm. In some embodiments, the charging element is located on a side surface of a handle of the firearm.

Some embodiments provide a firearm. The firearm comprises a trigger bar configured to move in a first direction to trigger discharging of the firearm. The firearm further includes a cam and a motor mechanically coupled to the cam. The firearm may further include a trigger bar stop having a first position in which the trigger bar stop prevents discharging of the firearm and a second position in which the trigger bar stop allows firing of the firearm.

In some embodiments, rotation of the cam causes rotation of the trigger bar stop between the first position and the second position. In some embodiments, when the trigger bar stop is in the first position, the trigger bar stop is engaged with the trigger bar preventing actuation of the trigger bar in the first direction. In some embodiments, when the trigger bar stop is in the second position, the trigger bar stop is disengaged from the trigger bar allowing actuation of the trigger bar in the first direction.

In some embodiments, a corner of the trigger bar stop fits into a recess of the cam when the trigger bar stop is in the first position. The corner of the trigger bar stop is outside of the recess of the cam when the trigger bar stop is in the second position. In some embodiments, the cam and the motor are disposed at least partially in a handle or grip of the firearm.

Some embodiments provide a safety system embedded inside a firearm. The safety system comprises a safety mechanism having a locked position that prevents discharging of the firearm and an unlocked position that permits discharging of the firearm. The safety system further comprises a wireless communication circuit configured to communicate with at least one device. The safety system further comprises a processor. The processor is configured to: (1) receive, through the wireless communication circuit from the at least one device, an unlock signal; and (2) cause the safety mechanism to change from the locked position to the unlocked position in response to receiving the unlock signal.

In some embodiments, the processor is configured to: (1) receive, through the wireless communication circuit from the at least one device, a lock signal; and (2) cause the safety mechanism to change from the unlocked position to the locked position in response to receiving the lock signal. In some embodiments, the processor is configured to: after causing the safety mechanism to change from the unlocked position to the locked position, transmit, using the wireless communication circuit to the at least one device, a signal indicating that the safety mechanism is in the locked position.

In some embodiments, the processor is configured to: after causing the safety mechanism to change from the locked position to the unlocked position, transmit, using the wireless communication circuit to the at least one device, a signal indicating that the safety mechanism is in the unlocked position.

In some embodiments, the safety system further comprises a status indicator indicating a current position of the safety mechanism. The status indicator has a first state indicating that the safety mechanism is in the locked position and a second state indicating that the safety mechanism is in the unlocked position. In some embodiments, the processor is configured to: (1) cause the status indicator to change from the first state to the second state after causing the safety mechanism to change from the locked position to the unlocked position; and (2) cause the status indicator to change from the second state to the first state after causing the safety mechanism to change from the unlocked position to the locked position. In some embodiments, the status indicator comprises a light source. The light source is configured to emit light of a first color in the first state and emit light of a second color in the second state.

In some embodiments, the unlock signal indicates that a user has successfully been authenticated by the at least one device. In some embodiments, the at least one device is a smartphone or a smartwatch. In some embodiments, the unlock signal comprises a Bluetooth signal. In some embodiments, the unlock signal comprises a near-field communication (NFC) signal.

In some embodiments, the firearm comprises a trigger bar, and the safety mechanism is configured to prevent actuation of the trigger bar when the safety mechanism is in the locked position. In some embodiments, the safety system comprises a battery, and a charging element configured to make an electrical connection with a charger to charge the battery. In some embodiments, the charger comprises an inductive charger, and the charging element comprises an inductive contact configured to make an electrical connection with the inductive charger. In some embodiments, the charging element comprises one or more pins configured to make an electrical connection with one or more electrical contacts of the charger. In some embodiments, the charging element is located on a base of a handle of the firearm. In some embodiments, the charging element is located on a side surface of a handle of the firearm.

Some embodiments provide a mobile device for communication with a safety system embedded in a firearm. The safety system is configured to lock the firearm to prevent firing of the firearm and unlock the firearm to allow discharging of the firearm. The mobile device comprises a wireless communication circuit and a processor. The processor is configured to: (1) receive, through an input interface of the mobile device, authentication information from a user of the mobile device; (2) determine, based on the authentication information, whether the user has permission to discharge the firearm; and (3) transmit, using the wireless communication circuit to the safety system, a signal that causes the safety system to unlock the firearm to allow discharging of the firearm when it is determined that the user has permission to discharge the firearm.

In some embodiments, the processor is further configured to: (1) receive, through the input interface, user input indicating a command to lock the firearm; and (2) transmit, using the wireless communication circuit to the safety system, a signal that causes the safety system to lock the firearm to prevent discharging of the firearm. In some embodiments, the signal comprises a Bluetooth signal. In some embodiments, the signal comprises an NFC signal.

Some embodiments provide a charging station configured to charge at least one safety system embedded inside at least one firearm. The at least one safety system configured to lock the at least one firearm to prevent discharging of the at least one firearm and unlock the at least one firearm to allow discharging of the at least one firearm. The charger station comprises at least one dock for placement of the at least one fire firearm, at least one electrical contact configured to make an electrical connection with at least one charging element of the at least one safety system, and at least one electrical charging circuit configured to transmit electricity to the at least one safety system when the at least one electrical contact makes an electrical connection with the at least one charging element of the at least one firearm.

In some embodiments, the at least one electrical charging circuit comprises an inductive charging circuit. In some embodiments, the at least one safety system comprises a plurality of safety systems and the at least one firearm comprises a plurality of firearms. The at least one electrical charging circuit is configured to transmit electricity to the plurality of safety systems when the at least one electrical contact makes an electrical connection with charging elements of the plurality of safety systems. In some embodiments, the at least one electrical contact makes an electrical connection with the at least one charging element of the at least one firearm when a side of the at least one firearm is placed on the charging station. In some embodiments, the at least one electrical contact is configured to make an electrical connection with at least one electrical pin of the at least one safety system.

Some embodiments provide a safety system embedded inside a firearm. The safety system comprises: a safety mechanism having a locked position that prevents discharging of the firearm and an unlocked position that allows discharging of the firearm; a fingerprint sensor located on an outer surface of the firearm, the fingerprint sensor configured to generate a fingerprint scan of a finger contacting the fingerprint sensor; a light source located proximate the fingerprint sensor; and an electrical circuit. The electrical circuit is configured to cause the safety mechanism to change between the locked position and the unlocked position in response to receiving the first signal from the fingerprint sensor indicating detection of the fingerprint of the user permitted to use the firearm.

In some embodiments, the light source emits light without requiring a power source. In some embodiments, the light source comprises a luminescent material. In some embodiments, the luminescent material comprises a phosphor that emits absorbed energy as light.

In some embodiments, the light source indicates whether the safety mechanism is in the locked position or the unlocked position. In some embodiments, the light source is configured to emit light of a first color when the safety mechanism is in the locked position and emit light of a second color when the safety mechanism is in the unlocked position. In some embodiments, the light source is a multi-color light-emitting diode (LED). In some embodiments, the light source is configured to emit light along an outer boundary of the fingerprint sensor.

In the following description, numerous specific details are set forth regarding the systems and methods of the disclosed subject matter and the environment in which such systems and methods may operate, etc., in order to provide a thorough understanding of the disclosed subject matter. In addition, it will be understood that the examples provided below are exemplary, and that it is contemplated that there are other systems and methods that are within the scope of the disclosed subject matter.

According to some embodiments, the ECMO safety system includes a set of sensors. FIGS. 1A-1C are diagrams of a firearm with examples of an electrically controlled, mechanically operated safety, according to some embodiments. As shown in FIGS. 1A-1B, the firearm includes an ECMO safety with three mechanical components: backstrap component 106, and side components 102 and 104. In some embodiments, the mechanical components are designed to require contact by a user's hand, as shown in FIG. 1B and FIG. 2. FIG. 2 is a diagram showing an example of the points on a person's hand that contact mechanical aspects of the electrically controlled, mechanically operated safety, according to some embodiments. Contact point 206 contacts mechanical component 102, contact point 204 contacts mechanical component 104, and contact point 202 contacts mechanical component 106. In some embodiments, the mechanical components may not require points on a person's hand to contact specific areas of the ECMO safety system.

In some embodiments, one or more sensors includes a biometric fingerprint sensor. For example, one or more of sensors 102 and/or 104 can be fingerprint sensors. Further examples of fingerprint sensors are described herein, such as in conjunction with FIGS. 12 and 17-18. The position of the biometric fingerprint sensor can be configured based on a desired finger for use with the fingerprint sensor. For example, the sensor can be mounted at a position similar to that shown as 102 and/or 104 for contact with the user's thumb. For contact with other fingers besides the user's thumb and/or for possible use with multiple fingers, the fingerprint sensor can be disposed on the firearm at an appropriate location accordingly. For example, for contact with the middle finger of the user while the user grips the firearm, the fingerprint sensor can be disposed on a side of the grip so that the middle finger of the user (while hand gripping the gun) will contact the fingerprint sensor. Additionally or alternatively, the user may instead choose to use their thumb with the fingerprint sensor. The biometric fingerprint sensor can also be used by the operator when not grasping the firearm. For example, while the fingerprint sensor may be placed in a location designed for contact with a user's finger while they grip the firearm, the user could operate the fingerprint sensor when not gripping the firearm. For example, a person with a hand size that is too small to operate the fingerprint sensor while grasping the firearm could use the fingerprint sensor with a finger (e.g., thumb or another finger) just prior to gripping the firearm.

While FIGS. 1A-1B show an ECMO safety system with three mechanical components (e.g., the side components 102/104 and the backstrap component 106), it should be appreciated that this is for illustrative purposes, as any number of mechanical components and arrangements can be used to carry out the techniques described herein (e.g., including those described herein). Further, it should be appreciated that other arrangements of the sensors and/or locations of the sensors can be used to carry out the techniques described herein. FIG. 1C is a diagram showing other exemplary locations for a set of one or more sensors to allow the user to program the sensors for locking and/or unlocking the firing mechanism, according to some embodiments. As shown in FIG. 1C, one or more sensors can be located along the front of the grip 150 of the handle of the firearm. For example, a first sensor can be placed at the top location 150A, a second sensor can be placed at the middle location 150B, and/or a third sensor can be placed at the bottom location 150C.

It should be appreciated that the locations 150A-150C shown in FIG. 1C are for illustrative purposes, and that other locations can be used according to the techniques described herein. For example, the sensor(s) can be located on a side of the grip (e.g., as described in conjunction with FIGS. 1D-1F), such as a left side of the grip (e.g., for a right-handed user) and/or a right side of the grip (e.g., for a left-handed user). In some embodiments, when sensors are disposed on a side of the grip, the sensors can be disposed close to the front edge of the grip and/or partially on both the front edge of the grip and the side of the grip (e.g., such that the sensors are disposed on a corner of the grip). As described herein, the number of sensors is configurable, and can include one sensor (e.g., disposed to come into contact with a first finger of the user when the user grasps the handle), two sensors (e.g., disposed to come into contact with a first and second respective finger of the user), three sensors (e.g., disposed to come into contact with a first, second and third respective finger of the user), four sensors, and/or the like.

According to some embodiments, the side components 102/104 and the backstrap component 106 can be sensors. For example, the sensors can be pressure-sensitive sensors within the grip of the handle. The pressure sensor can be a device that senses pressure and converts it into an electric signal where the amount depends upon the pressure applied. According to some embodiments, the pressure sensors can be hidden within the grip, such that the sensors are not visible to the user. As a non-limiting example of a pressure sensor that could be used according to the techniques described herein, pressure sensors available from TE Connectivity (TE) could be employed within the handle of the firearm. TE provides both standard and custom pressure sensors, from board level components to fully amplified and packaged transducers. Based on piezoresistive Micro-electromechanical systems (MEMS) and silicon strain gauge (Microfused, Krystal Bond) technology, TE's sensors can be used to measure a range of pressures that can be applied by an operator's hand. For example, assume the average adult male can achieve around 110 pounds (50 kg) of force in one hand and the average woman can achieve 66 pounds (30 kg) of force, the sensors can be configured to sense pressure over an area (e.g., in psi) sufficient to indicate that an adult male or female is grasping the handle of the firearm.

According to some embodiments, the sensors (e.g., sensors 150) can be used to implement a pin-pad type function. Such sensors can be, for example, input buttons, such that once pressed the sensor provides a signal indicative of the press(es), but if not pressed the sensor does not provide the signal. For example, an input button may be a tactile button. As another example, an input button may be a capacitive button.

In some embodiments, a tactile button may be a button that, when depressed, creates an electrical connection. For example, depression and release of the button may change a position of a switch of an electrical circuit (e.g., of a PCB). The switch may be turned on when the button is depressed, and the switch may be turned off when the button is released. Pressing of the tactile button may be detected based on an electrical signal obtained in response to creation of an electrical connection (e.g., when a switch is closed). One or more tactile buttons maybe programmed to accept a sequence of inputs unique to the individual. In some embodiments, a tactile button may be dome shaped.

In some embodiments, the button(s) can be programed to accept a sequence of inputs that is unique to the individual (e.g., set by the individual) to unlock the firearm. For example, one or more of sensors 150 can be used to implement a pin-pad-type function that allows a user to provide a code to unlock the firearm. The user may press each of the one or more sensors in a particular order in order to input the code. In some embodiments, the user only presses one sensor at a time to enter the code. In some embodiments, the user may press multiple sensors at a time as part of the pin to enter the code. The firearm can store a code that is compared with the input code to determine whether the user provided the proper authentication code, and therefore whether to unlock the firearm.

In some embodiments, one or more fingerprint sensors may be disposed on a same side of the grip of the firearm as a set of sensors used to implement a pin-pad function. For example, three tactile buttons or capacitive sensors can be disposed on a left side of the firearm (e.g., as shown in FIG. 1D). In some embodiments, such sensors can be disposed on the left side of the grip towards the front of the firearm. In some embodiments, such sensors can be disposed in other locations of the firearm, such as in a middle portion of the grip (e.g., on the left side and/or right side of the grip of the firearm), towards the bottom portion of the grip (e.g., at a lower-right portion of the left side of the grip and/or a lower-left portion of the right side of the grip).

Figure 1F:
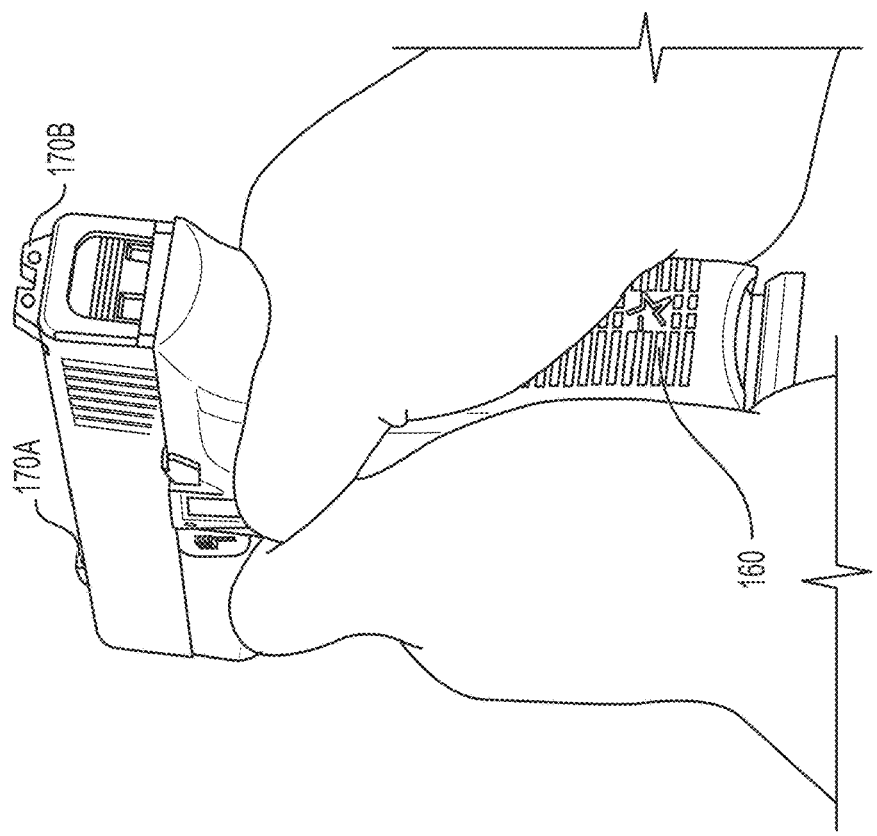
Figure 1E:
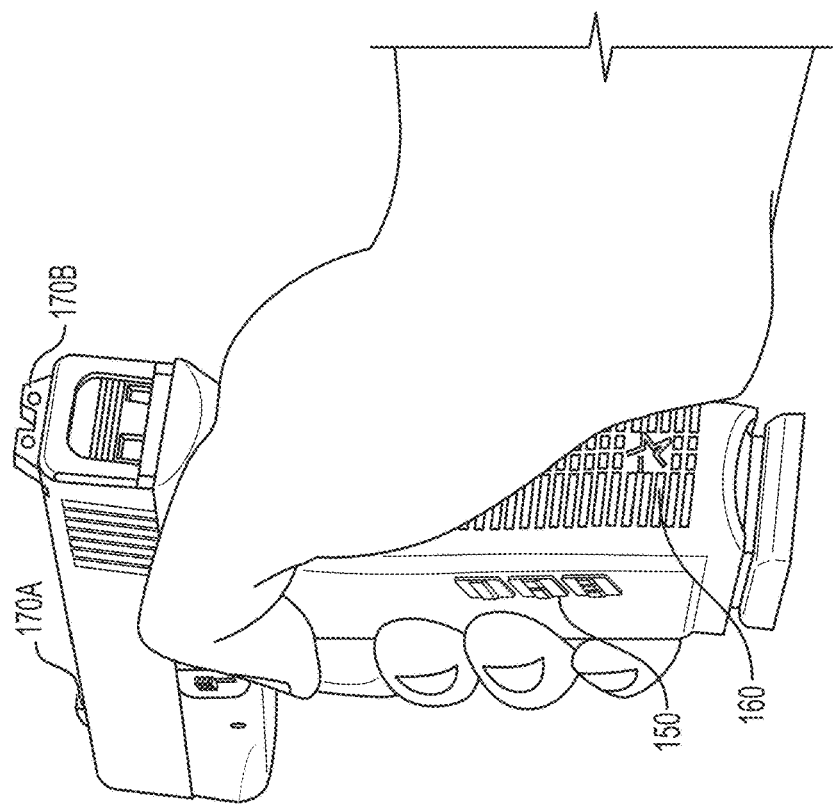
Figure 2:
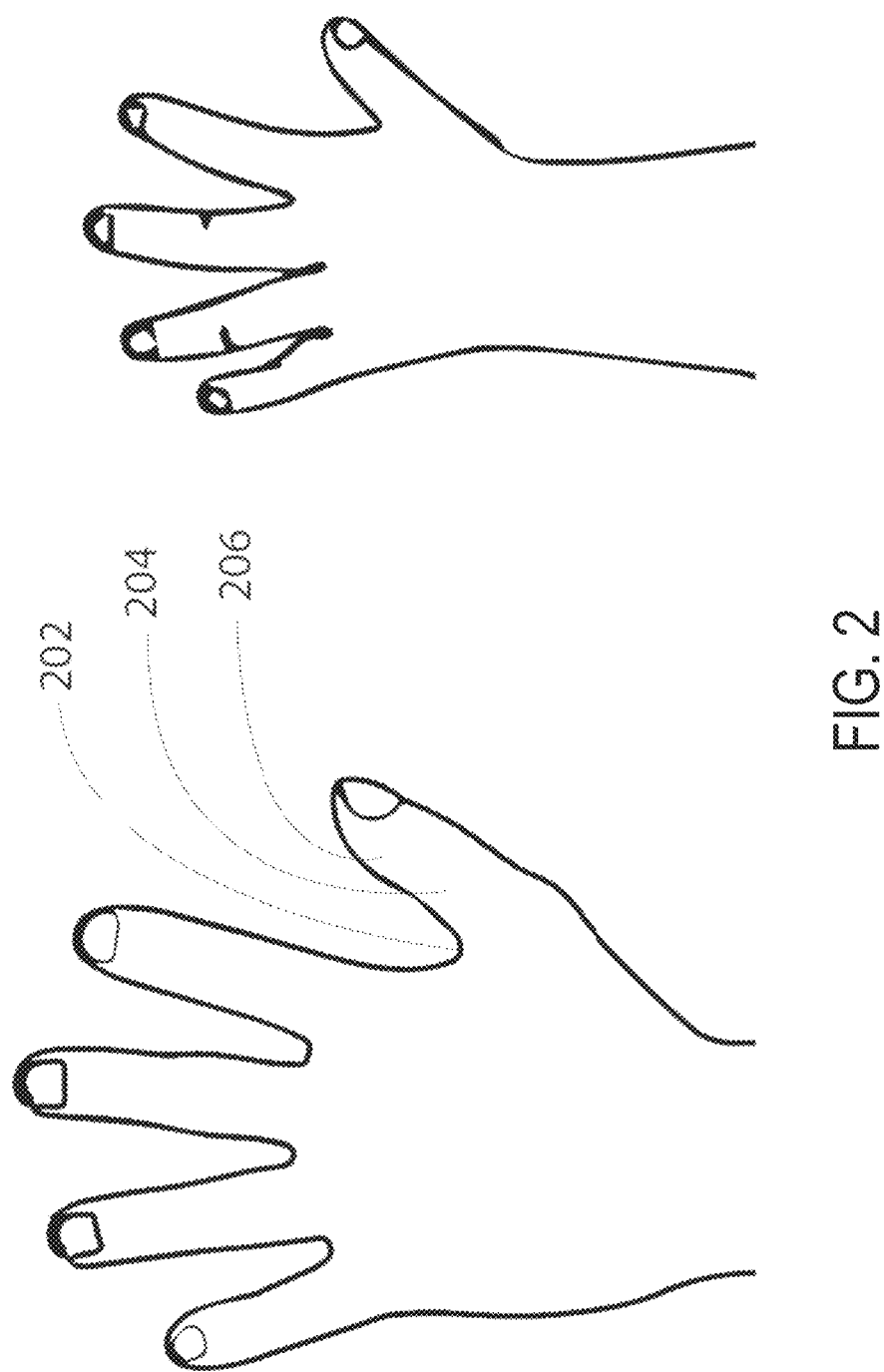
FIG. 2 is a diagram showing an example of the points on a person's hand that contact mechanical aspects of the electrically controlled, mechanically operated safety, according to some embodiments.

FIGS. 1D-1F are diagrams showing further exemplary locations for a set of sensors 150 to allow the user to use a pin pad feature for locking and/or unlocking the firing mechanism, according to some embodiments. In this example, the firearm includes the three sensors 150A, 150B and 150C in a lower portion of the left side of the grip of the firearm. In this example, the sensors 150 are disposed in the lower portion of the left side of the grip toward a rear of the firearm. While, in some embodiments, the sensors may be disposed in a location of the firearm for contact with the operator's hand during use, in some embodiments some sensors may be disposed in a location to avoid contact with an operator's hand during use (e.g., to avoid inadvertent pressing of the sensors during use). FIG. 1E shows that when a user grasps the firearm with a right hand, the user's fingers are not in contact with the sensors 150 given that they are disposed towards a back portion of the handle of the firearm (and thus, in this example, beyond where the user's fingers reach when grasping the firearm).

FIGS. 1D-1F also show exemplary indicators that can be used to indicate the state of the firearm, including a grip indicator 160 and a sight indicator 170 (which includes a front portion 170A and a rear portion 170B). The grip indicator 160 in this example can be a colored indicator that is disposed towards the back and bottom of the grip of the firearm (e.g., so that the indicator is visible when the operator is grasping the firearm). The sight indicator 170 can include one colored indicator at the front portion 170A and two colored indicators at the rear portion 170B, such that the indicators of the sight 170 can be used to aim the firearm (e.g., by aligning the indicators with the front indicator between the two rear indicators). As described herein, the grip indicator 160 and/or sight indicator 170 can change colors to indicate the locked state of the firearm.

Figure 1G:
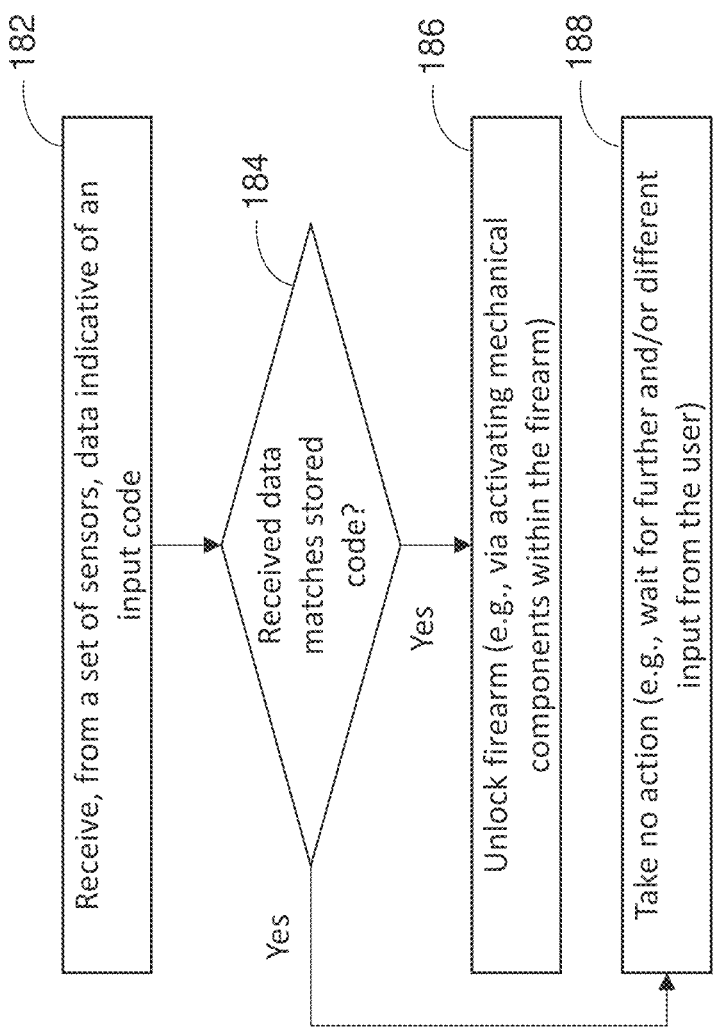
FIG. 1G is a diagram of an example process for unlocking and/or locking a safety system of a firearm using a pin code, according to some embodiments.

FIG. 1G is a diagram of an example process for unlocking and/or locking a safety system of a firearm using a pin code, according to some embodiments. At step 182, a processor of the firearm in communication with the pin pad receives input data from the one or more buttons indicative of an input code. At step 184, the processor determines whether the input code matches a stored code. Upon determining the input code matches the stored code, at step 186, the processor unlocks the firearm. For example, as discussed herein, the firearm can transmit a signal to a safety mechanism to change the safety mechanism from a first position to the second position so that the firearm can be fired by the operator. Otherwise, upon determining the input code does not match the stored code, at step 188, the processor takes no action and does not unlock the firearm. For example, the firearm may wait for further input from the user, such as additional pin data and/or other data, such as biometric authentication data, pairing data, instructions from an application, and/or the like, as described herein.

In some embodiments, the ECMO system may store an initial pin that can be used to unlock the firearm. A user of the firearm may be required to change the initial pin. For example, the user may be required to change the initial pin prior to a first use of the firearm. In some embodiments, the initial pin may be a default pin that the ECMO system can be reset to (e.g., through another authentication if the user forgets a pin).

In some embodiments, the sensors can be sufficiently spaced from each other such that each sensor is configured for contact with a different finger of the user when the user grasps the handle of the firearm (e.g., if desired by the user).

For example, a first sensor can be configured for contact with the user's pointer finger, a second sensor can be configured for contact with the user's middle finger, and a third sensor can be configured for contact with the user's ring finger. This can, for example, allow a user to easily enter a pin code to unlock or lock the firearm. It should be appreciated that, while the pin pad sensors can be configured for use by separate fingers, a user may choose to use the pin pad sensor using any desired finger or finger(s).

In some embodiments, the fingerprint sensor can be configured such that the user can operate the fingerprint sensor using one or more fingers (e.g., if desired by the user). For example, the fingerprint sensor can be disposed further into the left side of the handle so that the user can contact the fingerprint sensor with multiple fingers (e.g., the user's middle finger and/or thumb) when the user grasps the handle.

According to some embodiments, the sensors can be in electrical communication with a power source (e.g., a battery) and one or more processors and one or more non-transitory computer-readable storage media (memory and/or non-volatile storage device(s)), as discussed further herein. The one or more processors may control writing data to and reading data from the non-transitory media in any suitable manner, as the aspects of the invention described herein are not limited in this respect. To perform functionality and/or techniques described herein, the processor(s) may execute one or more instructions stored in one or more computer-readable storage media, which may serve as non-transitory computer-readable storage media storing instructions for execution by the processor.

Figure 12:
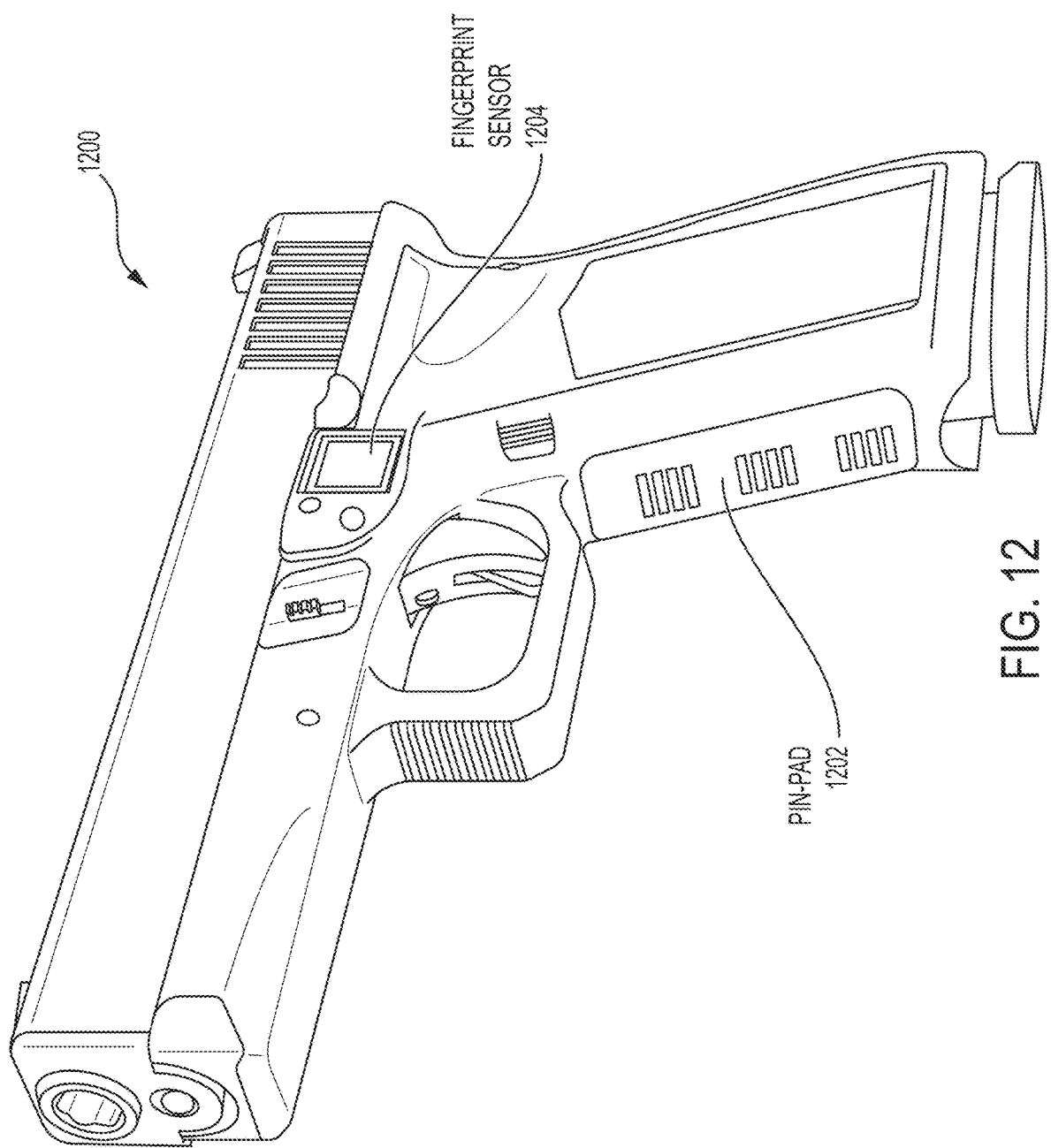
FIG. 12 is a firearm with a pin pad for locking and unlocking the firearm, according to some embodiments.

FIG. 12 is a firearm 1200 with a pin-pad 1202 and a fingerprint sensor 1204 for locking and unlocking the firearm, according to some embodiments. In the example firearm 1200 of FIG. 12, the pin-pad 1202 is located on a surface of the grip of the firearm 1200. The pin-pad 1202 is placed such that a user's fingers may contact buttons of the pin-pad 1202 when holding the grip of the firearm 1200. For example, the pin-pad 1202 may include buttons that can be pressed by the fingers of a user holding the grip of the firearm to input a code that locks or unlocks a firing mechanism of the firearm 1200 (e.g., by causing a safety mechanism embedded within the firearm 1200 to change between a locked position and an unlocked position).

In the example of FIG. 12, the fingerprint sensor 1204 is disposed on a side surface of the firearm 1200. The fingerprint sensor 1204 may be configured such that a user can contact one or more of the user's fingers with the fingerprint sensor 1204 to lock or unlock a firing mechanism of the firearm 1200 (e.g., by changing a position of a safety mechanism within the firearm). For example, the user may place an index finger on the fingerprint sensor 1204. If a detected fingerprint is determined to be associated with a user authorized to use the firearm 1200, the firing mechanism of the firearm 1200 may be unlocked (e.g., by changing a position of a safety mechanism to allow actuation of a trigger bar within the firearm 1200).

Figure 7C:
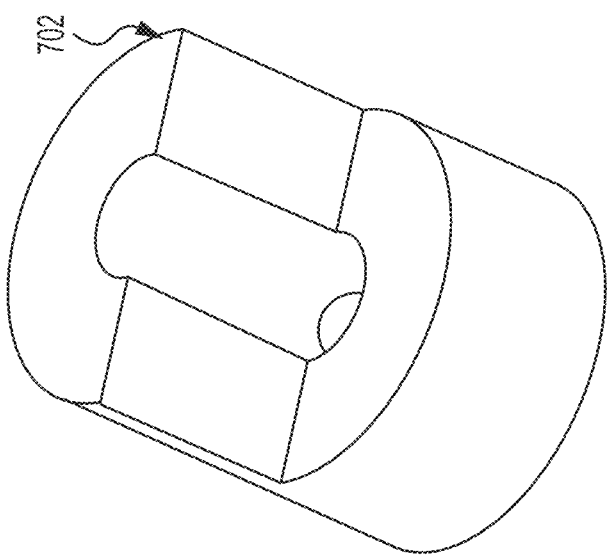
FIGS. 7A-7J are diagrams of illustrative mechanical components used to mechanically lock and unlock the firearm, according to some embodiments.
Figure 7B:
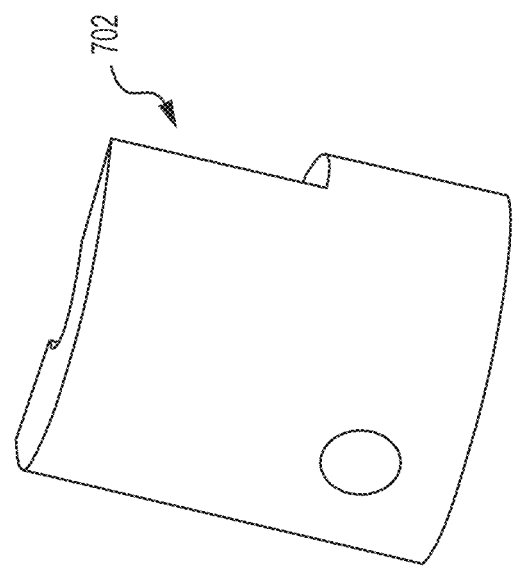
Figure 7A:
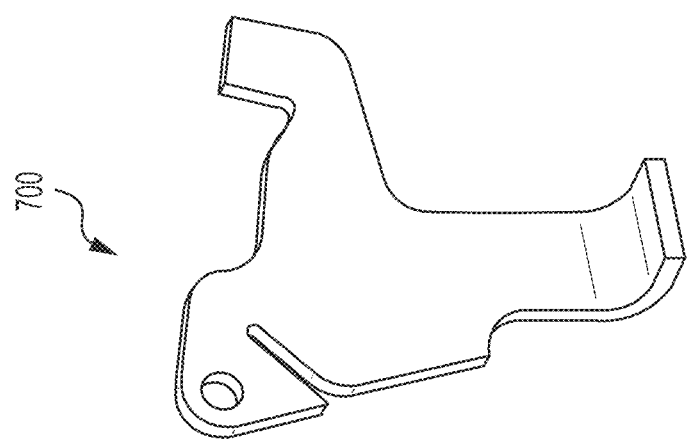
Figure 7F:
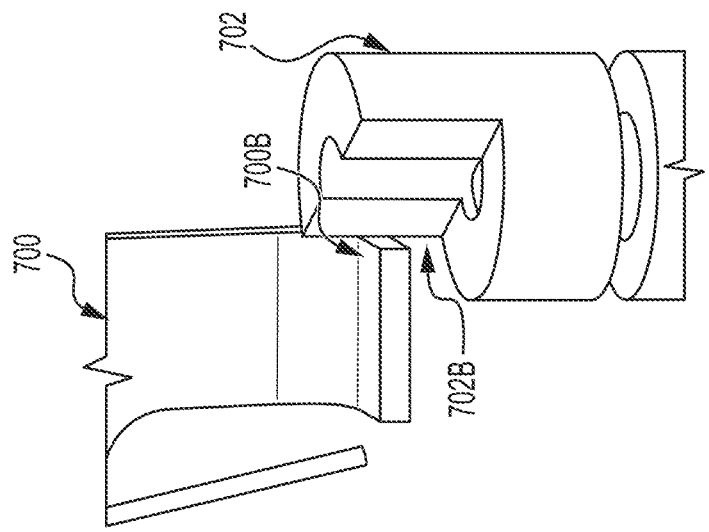
Figure 7E:
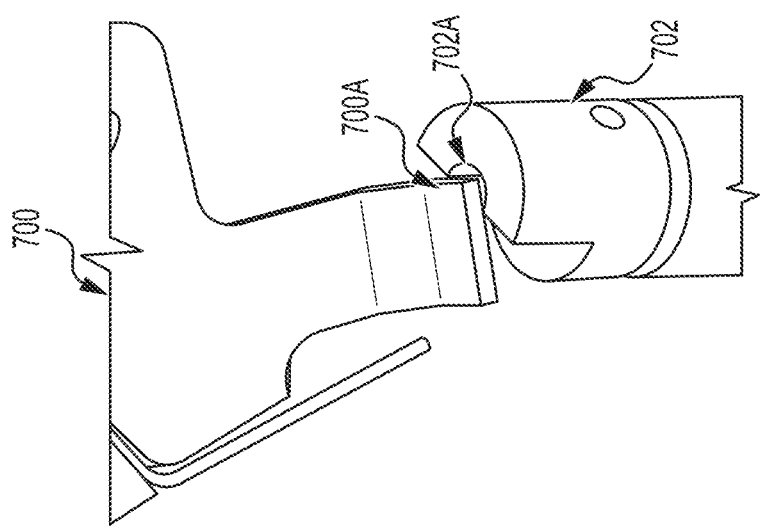
Figure 7D:
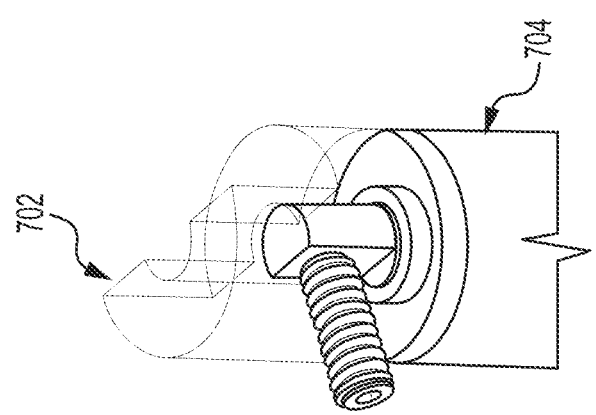

FIGS. 7A-7F show examples of an electrical motor used to drive a cam that mechanically actuates a trigger bar stop, according to some embodiments. FIG. 7A is a perspective view of the trigger bar stop 700, which includes a lower portion with a curved end that extends outwards from the surface of the lower portion. FIGS. 7B-7C show to different perspective views of cam 702, according to some embodiments. The cam 702 in this example has an approximate circular shape about its axis of orientation, such that the cam 702 is cylindrical. The cam 702 has a lower portion and an upper portion, with the full circular body of the cylinder present at the lower portion of the cam 702 and only approximately half of the circular body of the cylinder present at the upper portion of the cam 702 (the cam 702 also includes a hollow middle portion extending along the axis of orientation, which in this example is also cylindrical in shape). FIG. 7D shows the cam 702 mounted on an electrical motor 704 via a protrusion of the motor extending along the axis of rotation into the hollow middle portion of the cam 702, and secured to the protrusion via a screw. FIG. 7E shows the cam 702 rotated to a first position by the motor 704, at which the corner 700A of the curved end of the lower extending portion of the trigger bar stop 700 fits within a recess 704A of the cam 702, where the recess 704A is provided by the half of the circular shape present for the upper portion of the cam 702. In this example, the protrusion from the motor 704 only extends into the lower portion of the cam 702 and not into the upper portion of the cam 702, and the screw is secured to a flat surface of the protrusion (the remaining shape of the protrusion is cylindrical) via a screw hole in the lower portion of the cam 702. As will be described further, this first position effectuates a locked position of the firearm where the trigger bar stop 700 prevents firing of the firearm. FIG. 7F shows the cam 700 rotated to a second position by the motor 704, at which the side 700B of the trigger bar stop 700 is pushed towards the front of the firearm by the side 704B of the cam 702. As will also be described further, this position unlocks the firearm and allows firing of the firearm.

Figure 7H:
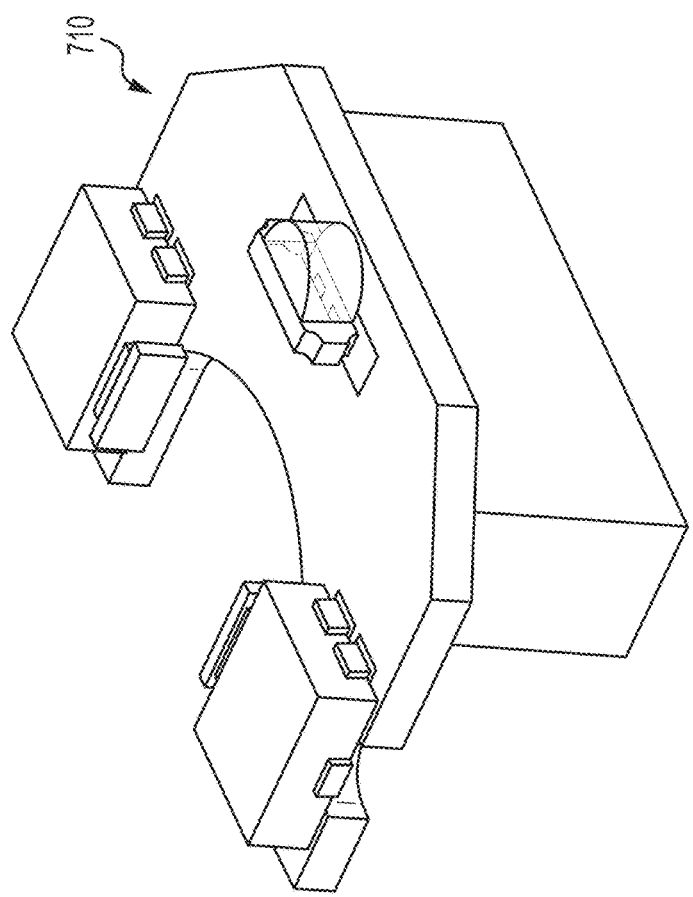
Figure 7G:
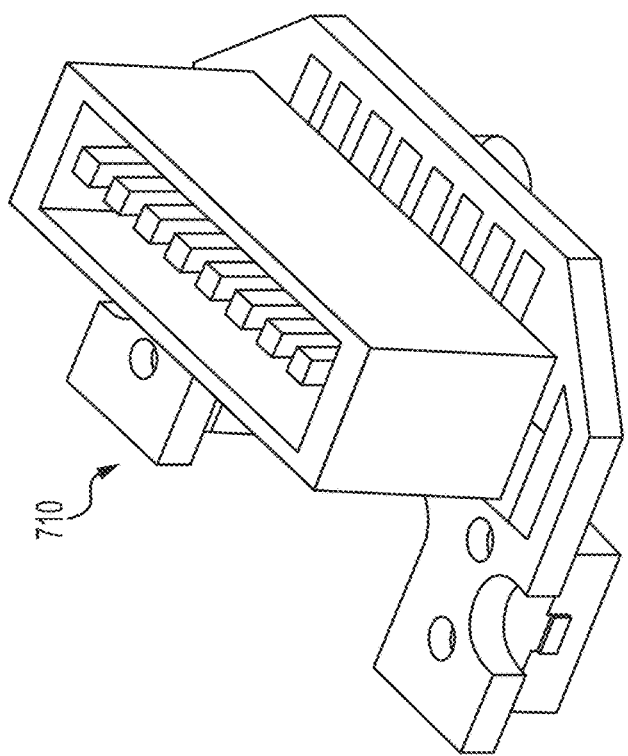

FIGS. 7G and 7H show different perspective views of a flexible printed circuit board (PCB) 710, according to some embodiments. While some examples use a flexible PCB, it should be appreciated that the techniques are not so limited, and that other PCB configurations can be used with the techniques described herein. For example, the techniques can use rigid PCBs and/or a combination of one or more flexible PCBs and one or more rigid PCBs (and/or a PCB with both flexible and rigid portions).

Figure 7J:
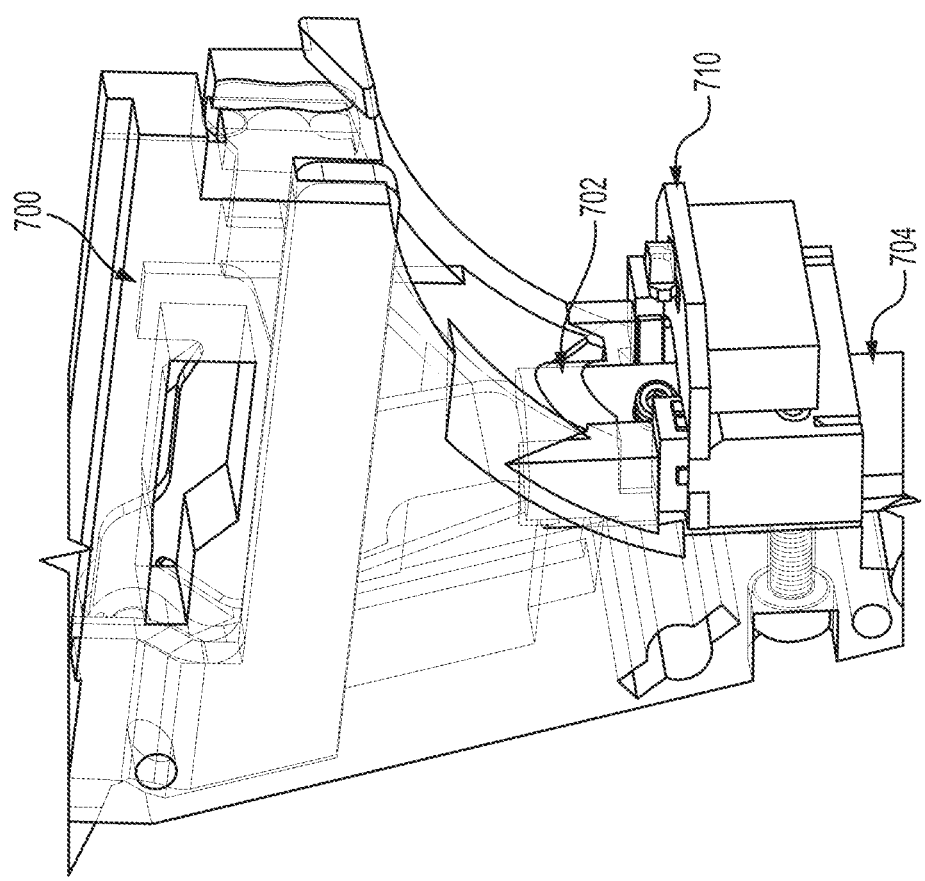
Figure 7I:
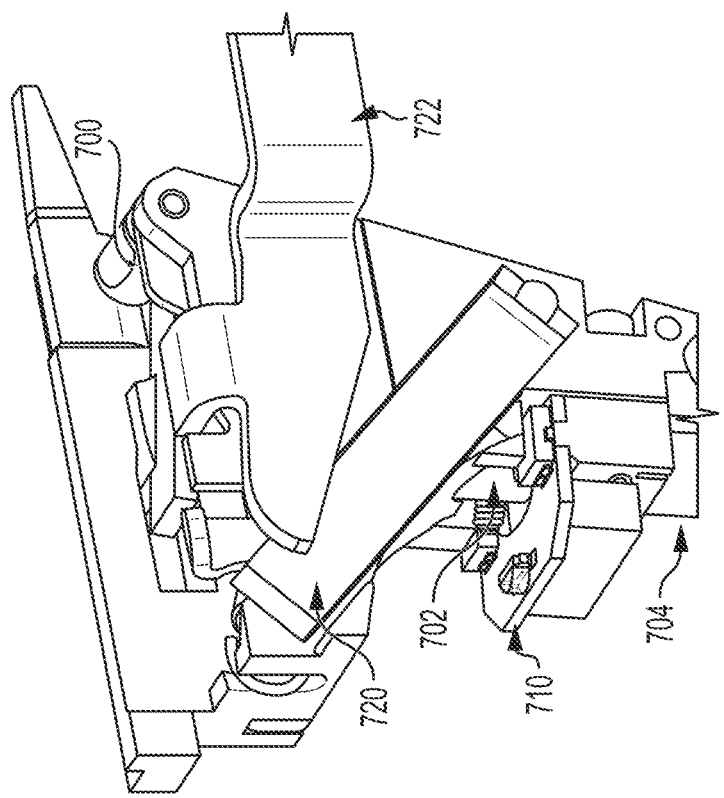

FIGS. 7I and 7J show the trigger bar stop 700, cam 702, motor 704, and flexible PCB 710 as mounted within a portion of an exemplary firearm. Additional components are shown in FIGS. 7I and 7J, including a connector bar 720 and a trigger bar 722.

FIGS. 8A-8D illustrate the operation of the mechanical components of the firearm, including the trigger bar stop 700, cam 702, motor 704, and trigger bar 722, to lock and unlock the firearm, according to some embodiments. Generally, when a user presses the trigger, the trigger pushes the trigger bar 722 backwards (towards the right of FIGS. 8A-8D). When the trigger bar stop 720 is in a locked position as shown in FIG. 7A, the top protrusion 700C of the trigger bar stop 700 is in a position that engages with the portion 722A of the trigger bar 722. As a result, when the user presses the trigger, the trigger bar 722 is blocked from moving backwards by the trigger bar stop 700. Accordingly, the trigger bar 722 cannot engage with the connector 720 to move the connector 720 downwards from the sear 730A of the firing pin 730 in order to fire the firearm. This locked position is effectuated by having the cam 702 in the first position shown in FIG. 7E (effectuated by the motor 704). Since the trigger bar stop 700 rotates about pivot point 700D, when in the locked first position, the corner 700A fits within the cam 702 so that the trigger bar stop 700 is rotated upwards so that the top protrusion 700C of the trigger bar stop 700 engages the portion 722A of the trigger bar 722.

Figure 8A:
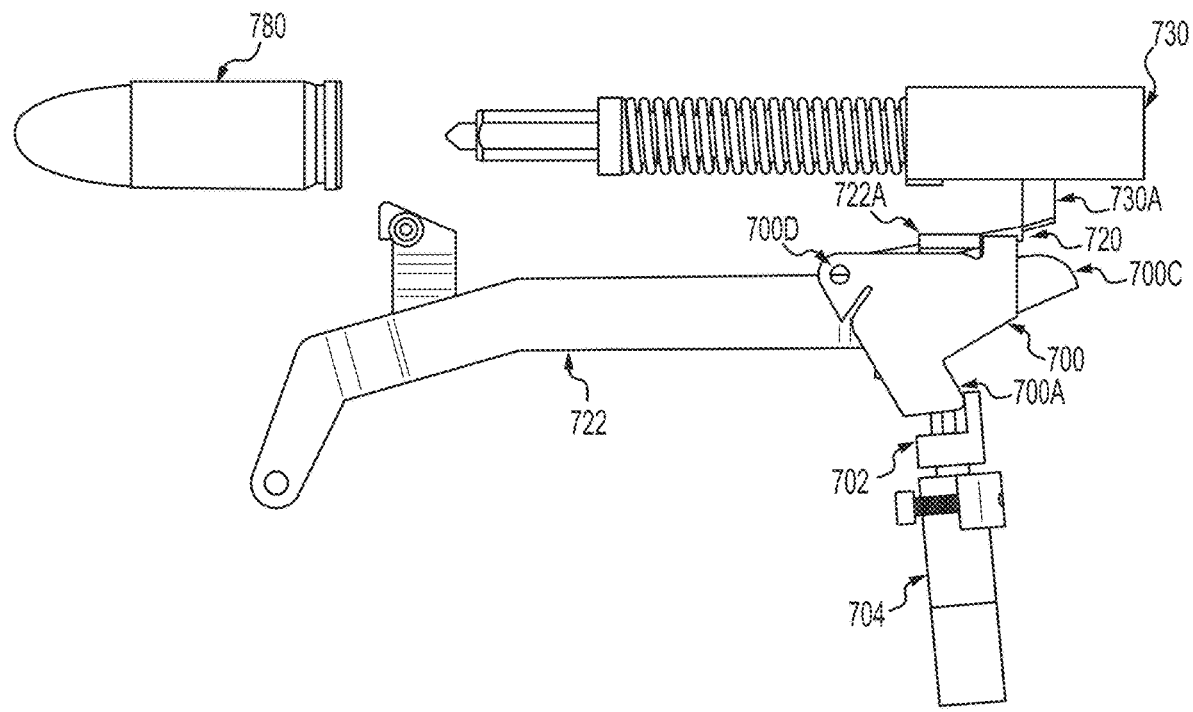
FIGS. 8A-8D are diagrams that show the mechanical operation of the components described in FIGS. 7A-7J, according to some embodiments.
Figure 8B:
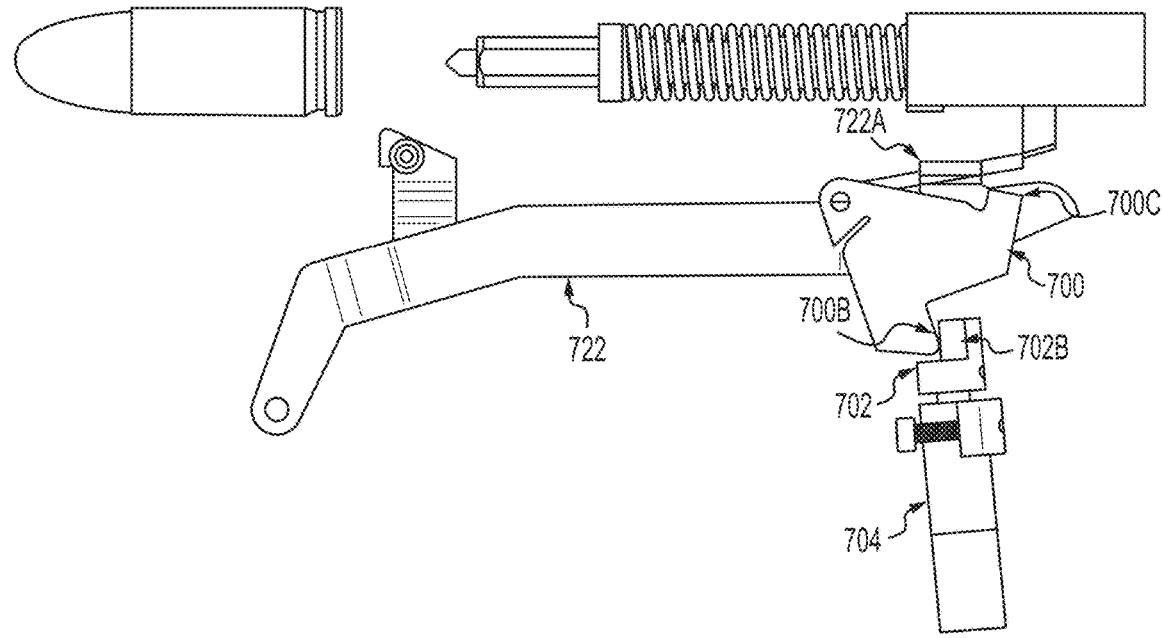

When the trigger bar stop 720 is in an unlocked position as shown in FIG. 8B, the top protrusion 700C of the trigger bar stop 700 is moved downwards so that it does not engage with the portion 722A of the trigger bar 722. As a result, when the user presses the trigger, the trigger bar 722 is allowed to move backwards so that the trigger bar 722 can engage with the connector 720 to move the connector 720 downwards from the sear 730A of the firing pin 730 in order to fire the firearm. In some embodiments, the connector 720 only needs to be moved a few thousands of an inch downwards to release the sear 730A of the firing pin 730. This unlocked position is effectuated by having the cam 702 in the second position shown in FIG. 7F (again, effectuated by the motor 704). When in the unlocked second position, the side 700B of the trigger bar stop 700 is pushed towards the front of the firearm by the side 704B of the cam 702, causing the trigger bar stop 700 to rotate downward about pivot point 700D.

Figure 8C:
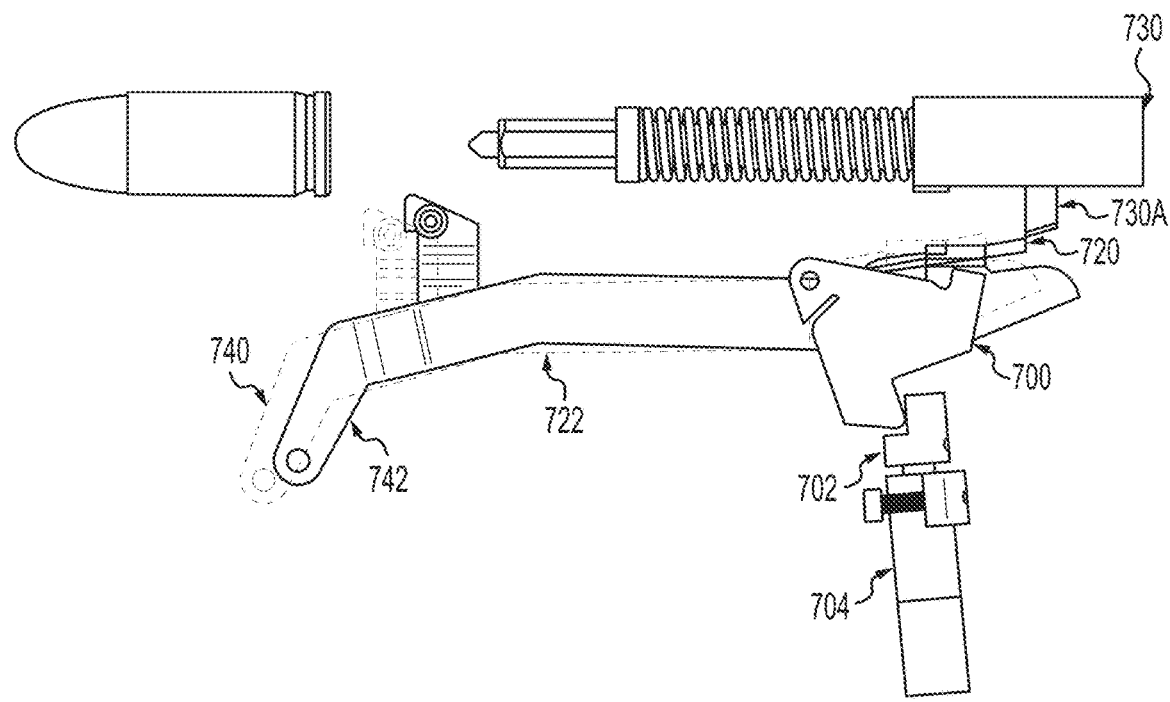
Figure 8D:
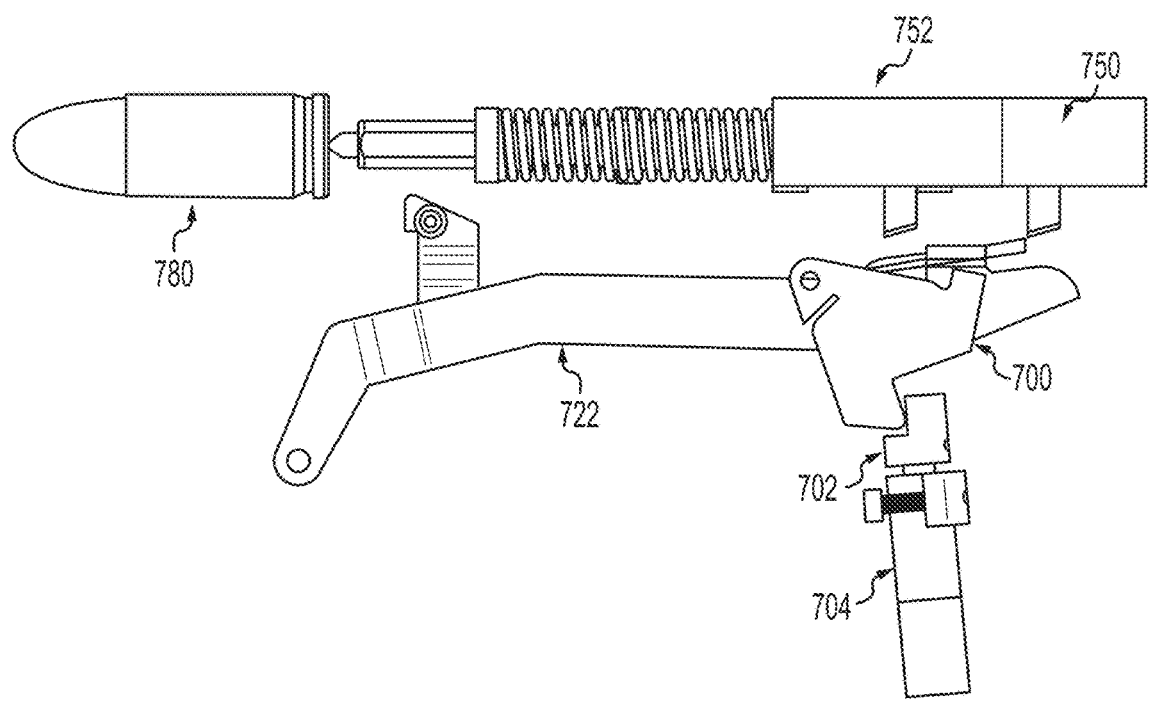

FIG. 8C shows a first position 740 of the trigger bar 722 (shown in fantom), prior to the user pressing the trigger, and a second position 742 of the trigger bar 722 after the user presses the trigger. In FIG. 8C, the connector 720 has been moved downwards from the sear 730A due to the movement of the trigger bar 722 to the second position 742, allowing actuation of the firing pin 730. FIG. 8D shows the resulting movement of the firing pin 730 from a first position 750 to a second position 752, at which point the firing pin 730 strikes the primer of the cartridge 780 to fire the firearm.

Figure 9A:
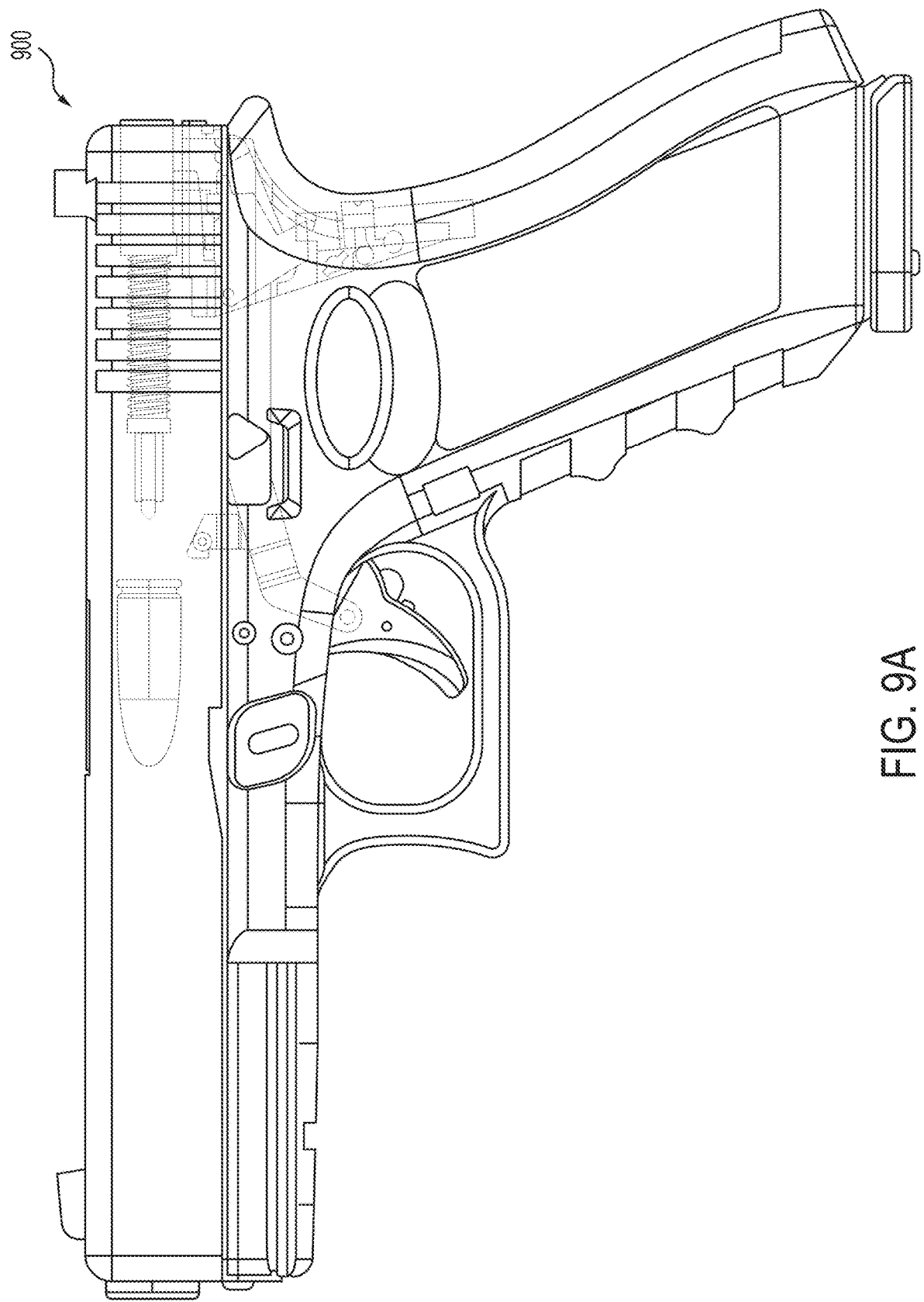
FIGS. 9A-9B are phantom diagrams of an exemplary firearm with the components of FIGS. 7A-7J disposed within the firearm, according to some embodiments.
Figure 9B:
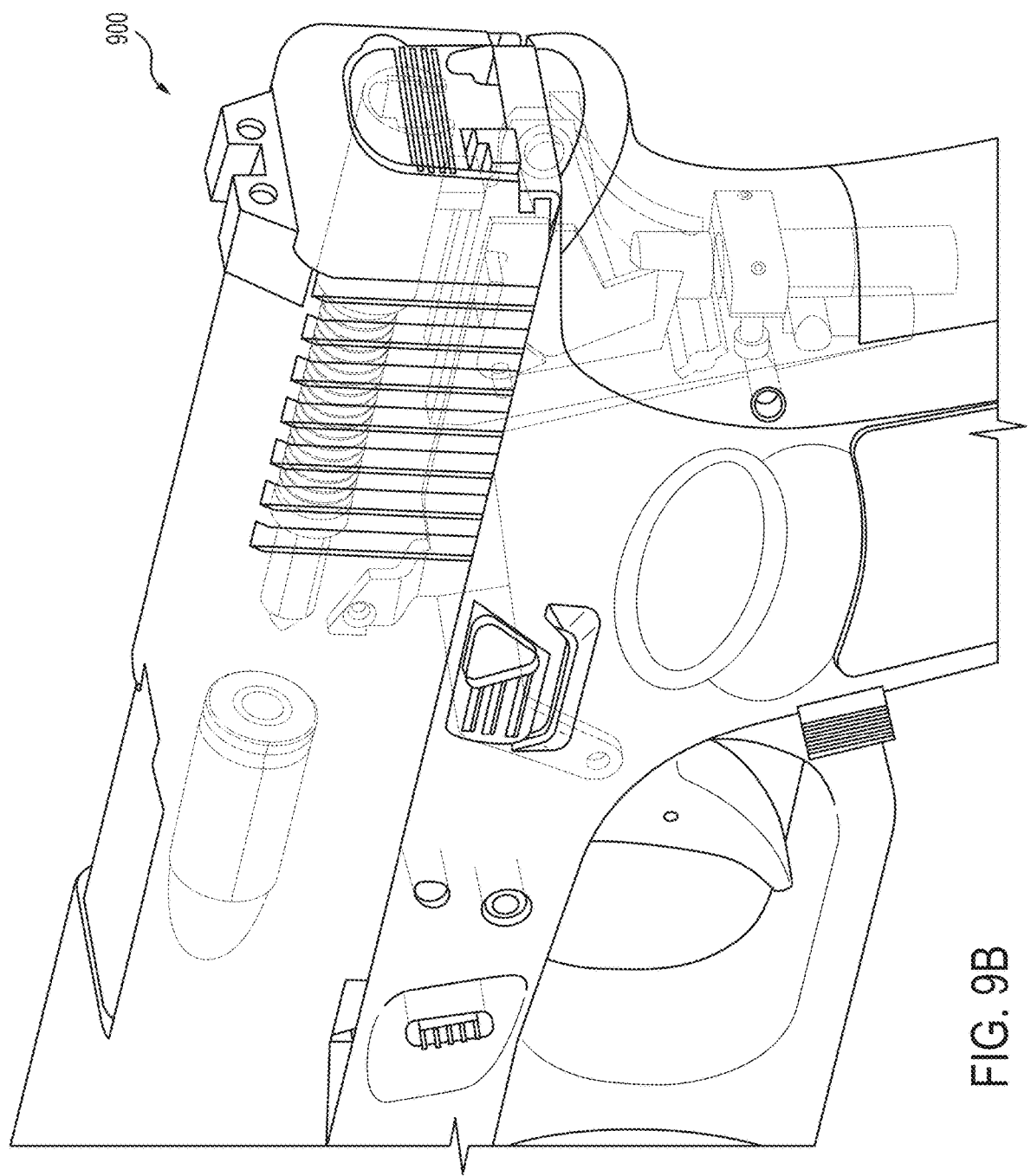
Figure 10A:
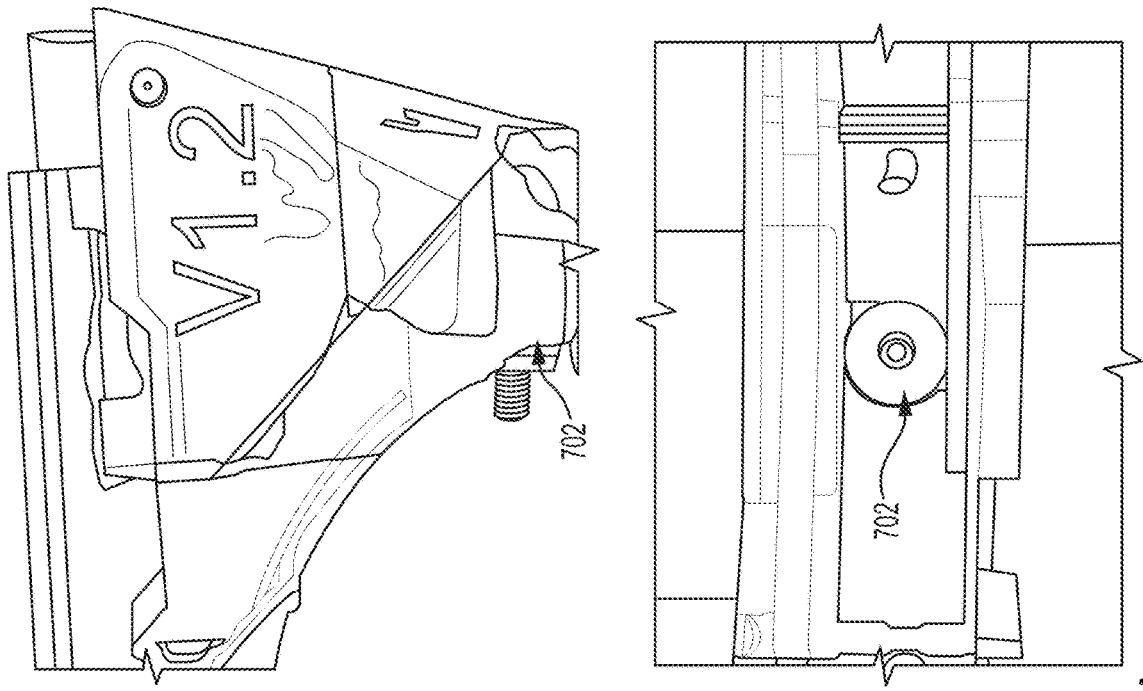
FIGS. 10A-10B are images of exemplary machined components used to implement and test the components described herein, according to some embodiments.
Figure 10A:
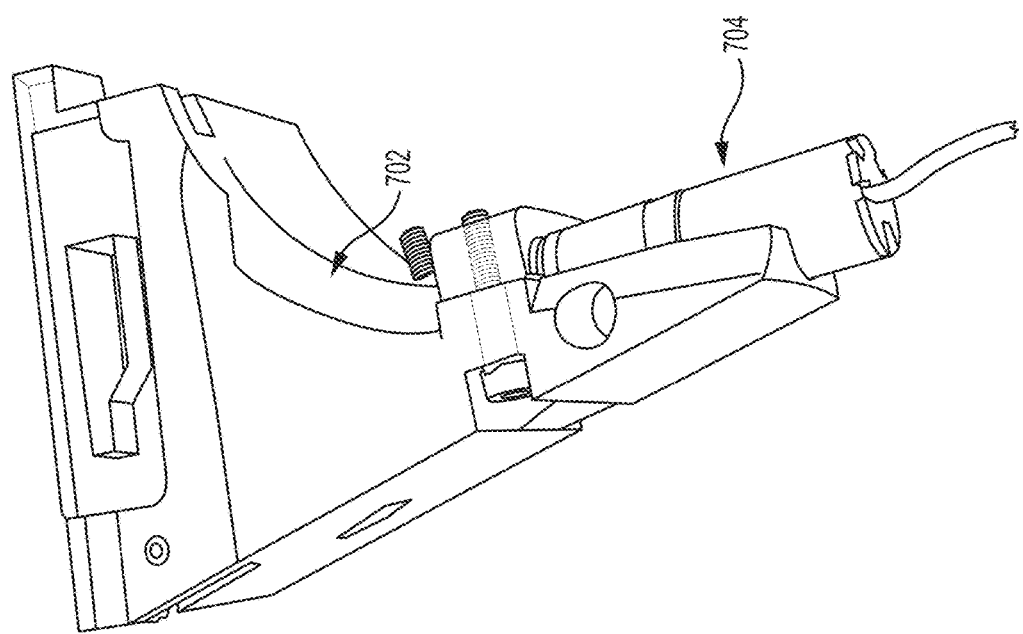
Figure 10B:
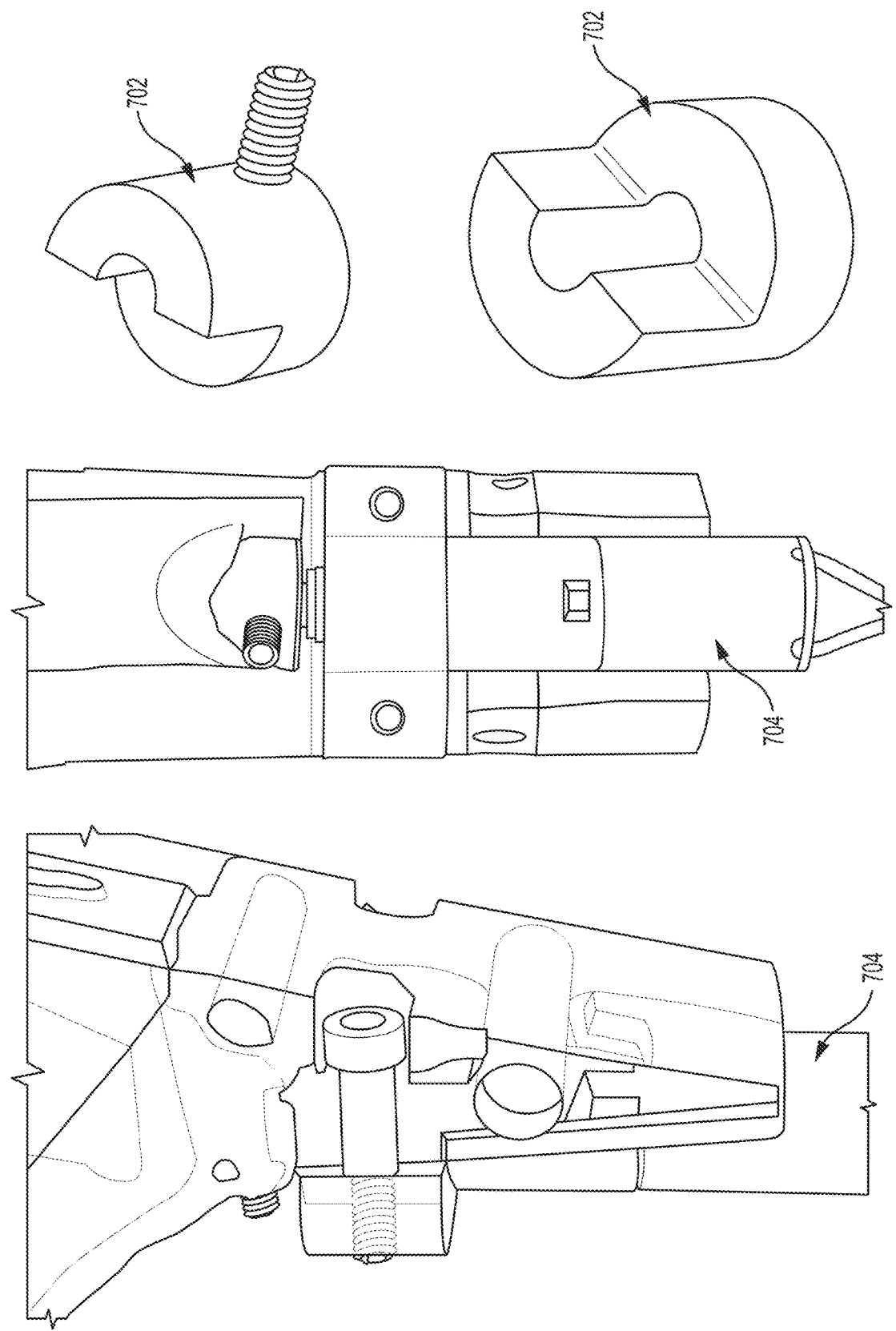

FIGS. 9A-9B show the components discussed in conjunction with FIGS. 7A-8D within an exemplary firearm 900, according to some embodiments. FIGS. 10A-10B show exemplary machined parts used to implement and test the components discussed in conjunction with FIGS. 7A-8D, according to some embodiments. FIGS. 10A-10B show, in particular, the cam 702 and the motor 704.

In some embodiments, the firearm can include an onboard memory and/or other computerized storage for storing usage data, firearm metrics, and/or other information. For example, the flexible PCB can include a memory used to store firearm usage data. The usage data can be used, in effect, as an on-board black box that stores use data and can be accessed for future analysis (e.g., to investigate a use of the firearm). The usage data can include, for example, data indicative of each time the firearm is locked and/or unlocked (e.g., including a timestamp for each associated change in the firearm lock state). As another example, the usage data can additionally or alternatively include data indicative of each time the firearm is discharged (e.g., including timestamp data). As a further example, the usage data can additionally or alternatively include data indicative of battery state information (e.g., when the battery is charged, when the battery becomes low, etc.). As another example, the usage data can additionally or alternatively include data indicative of a firearm malfunction (e.g., dead battery). In some embodiments, the usage data can be compiled for the lifetime of the firearm. In some embodiments, the usage data can be cleared and/or reset (e.g., manually, by computer and/or a phone application that interfaces with the firearm, after a predetermined duration (e.g., five years, ten years, etc.)).

In some embodiments, the storage of the firearm may store configuration settings for a user. The configuration settings may be customized by the user. For example, a user may configure a setting indicating a state of the firearm if a battery of the ECMO system dies. As another example, a user may configure a setting for a number of unlock attempts allotted before the firearm is disabled (e.g., and requires a master unlock authentication to be performed to unlock the firearm). As another example, a user may configure a setting indicating an amount of time of non-activity that triggers locking of the firearm. As another example, the configuration settings may indicate data that is to be stored in storage. The data may include, for example, shot count, time between shots, and/or other data. These settings may be stored in the storage of the firearm.

In some embodiments, the storage of the firearm may store information that may be obtained from a mobile device communicatively coupled with the firearm. For example, the storage may store user information (e.g., identification information), mobile device information (e.g., identification information), geographic location data, and/or other information. The storage of the firearm may store information in conjunction with firearm usage data. For example, the storage may store geographic location associated with discharge(s) of the firearm, locking/unlocking of the firearm, charging, and/or other firearm usage data.

Figure 6:
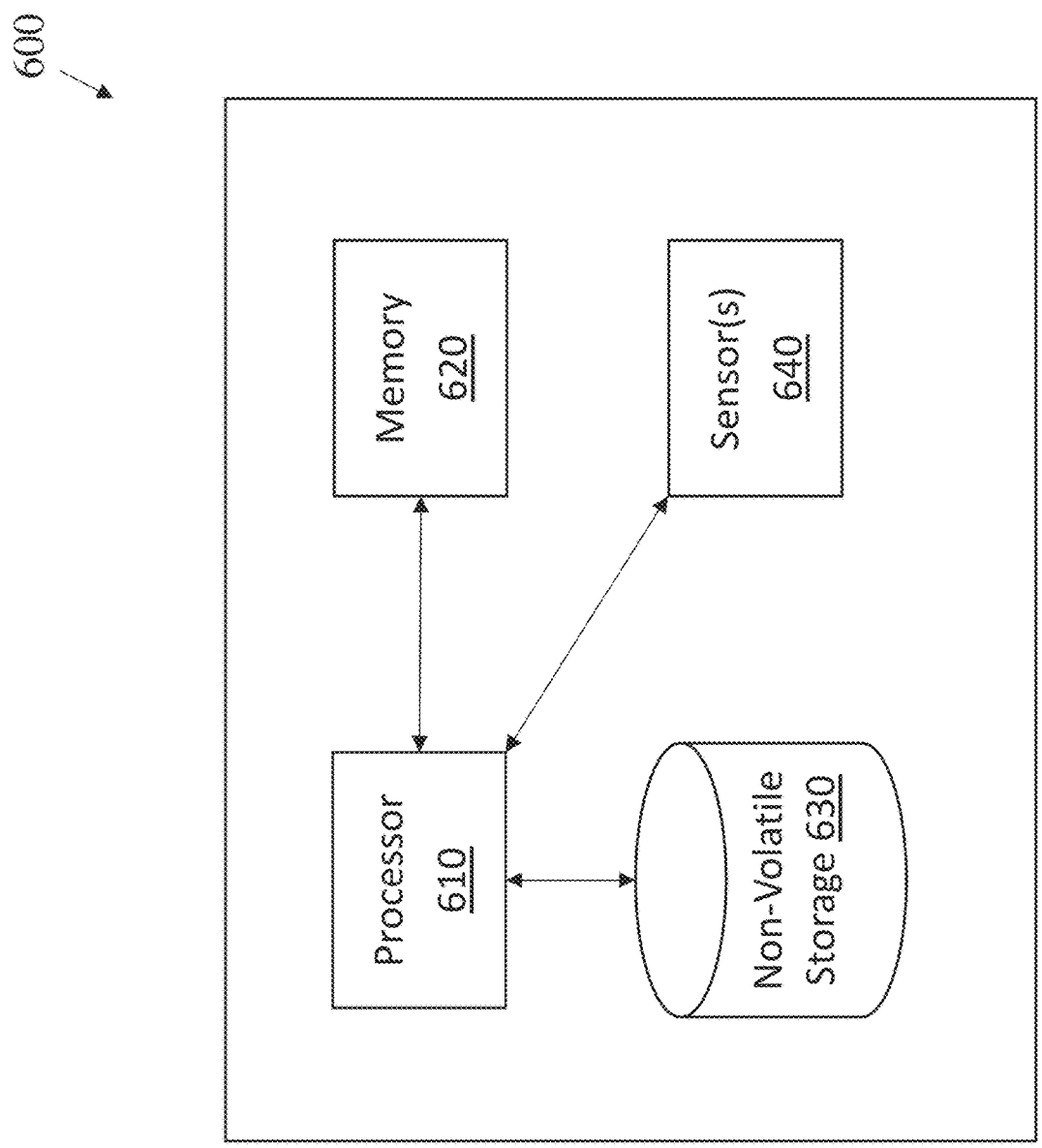
FIG. 6 shows an illustrative implementation of a system that may be used to perform any of the aspects of the embodiments.

An illustrative implementation of a system 600 that may be used to perform any of the aspects of the techniques and embodiments disclosed herein is shown in FIG. 6. The system 600 can be disposed in, for example, a firearm as described herein. The system 600 may include one or more processors 610 and one or more non-transitory computer-readable storage media (e.g., memory 620 and/or one or more non-volatile storage media 630) and a set of one or more sensors 640. The processor 610 may control writing data to and reading data from the memory 620 and the non-volatile storage device 630 in any suitable manner, as the aspects of the invention described herein are not limited in this respect. To perform functionality and/or techniques described herein, the processor 610 may execute one or more instructions stored in one or more computer-readable storage media (e.g., the memory 620, storage media, etc.), which may serve as non-transitory computer-readable storage media storing instructions for execution by the processor 610.

In connection with techniques described herein, code used to, for example, provide electronic control of a firearm based on the one or more sensors 640 may be stored on one or more computer-readable storage media of system 600. Processor 610 may execute any such code to provide any techniques for providing an ECMO, as described herein. Any other software, programs or instructions described herein may also be stored and executed by system 600. It will be appreciated that computer code may be applied to any aspects of methods and techniques described herein. For example, computer code may be applied to interact with an operating system to provide an ECMO as described herein through conventional operating system processes. While not shown, the system 600 can include one or more mechanical locking aspects used to control the locking and unlocking of the firearm.

According to some embodiments, the processor 610 can be configured to execute computer program instructions that cause the processor to monitor data from the sensor(s) 640 and determine, based on the monitored data, whether to unlock the firearm for use. In some embodiments, the processor can monitor data from a biometric sensor, such as a fingerprint sensor, as described herein, to determine whether a user's fingerprint matches stored authentication data (e.g., stored fingerprint and/or data used to analyze information received from the fingerprint sensor).

In some embodiments, as described herein, the ECMO can be designed to require a user to input a pin code in order to activate the firearm for use. For example, the processor 610 can be programmed to require receiving data indicative of a pin code prior to unlocking the firearm. The processor 610 can further be programmed to allow a user to lock an unlocked firearm, such as by entering the same pin code and/or automatically locking the firearm after one or more associated actions (e.g., expiration of a time duration, charging the firearm, holstering the firearm, receiving a lock indication from a remote computing device, etc.).

In some embodiments, as described herein, the ECMO can be designed to require a certain degree of contact of a user's hand to the firearm in order to activate the firearm for use. For example, the processor 610 can be programmed to require receiving data indicative of a certain level of pressure from each of the sensors 640 prior to unlocking the firearm (e.g., at least 70% of the expected pressure for sufficient contact to each sensor). According to some embodiments, the pressure required at each sensor 640 can be that sufficient to require an adult hand to activate the firearm, such that a child's hand will not be able to sufficiently exert pressure at each of the sensors (which are spaced out accordingly) to activate the firearm.

According to some embodiments, the operation of the ECMO sensors can be customized for each user. For example, the ECMO can be adjusted to fit the operation of the ECMO sensors to each particular user, since hand sizes, grips, and/or the like may vary from individual to individual. As another example, the ECMO can be programmed by a user to use a desired pin to lock and/or unlock the firearm. In some embodiments, for example, a remote computing device can pair with the firearm to control the settings of the ECMO.

Figure 3:
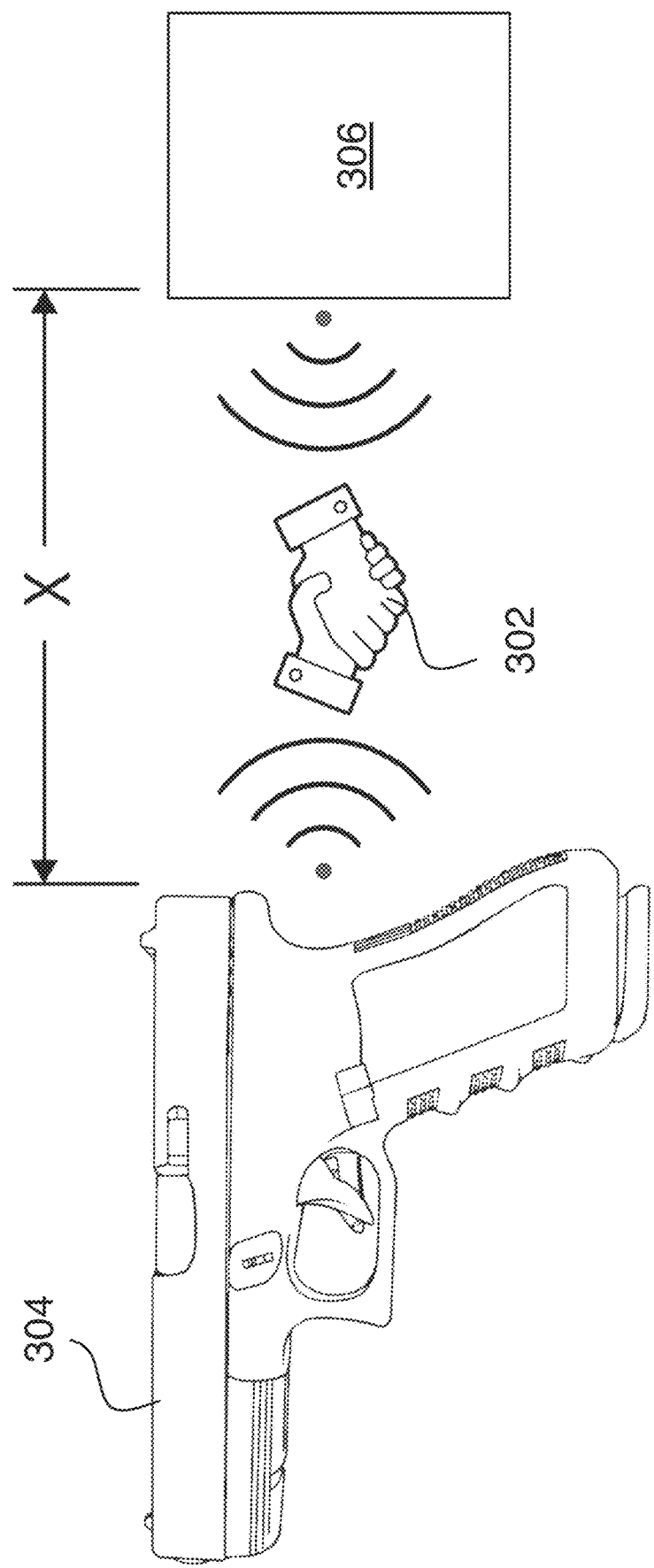
FIG. 3 is a diagram showing a handshake process for authenticating a user to a firearm with an electrically controlled, mechanically operated safety, according to some embodiments.

According to some embodiments, an authentication process (e.g., a wireless pairing process, a fingerprint authentication, etc.) can be used in conjunction with the ECMO. FIG. 3 is a diagram showing a handshake process 302 for authenticating a user to a firearm 304 with an electrically controlled, mechanically operated safety, according to some embodiments. A user can wear an authentication device 306 as shown in FIG. 3. The authentication device can be a smart watch and/or any other type of authentication device, such as a smartphone, RFID-enabled ring, a device that includes an authentication hardware and/or circuitry, and/or the like. Once the authentication device is within a certain distance, shown as "X" in FIG. 3 (e.g., a proximity that is supported by Bluetooth, RFID, near-field communication (NFC) etc.), the authentication device is configured to perform a handshake process with the ECMO safety to authenticate the user to use the firearm. The processor used to implement the ECMO can include wireless communication functionality (e.g., RFID, Bluetooth, etc.). In some embodiments, the wireless communication functionality may comprise a wireless communication circuit that can be used by the processor to communicate with the device 306. For example, while not shown in FIG. 6, the processor 610 can include wireless communication functionality that allows the processor 610 to wirelessly communicate with the authentication device 306. In some embodiments, the ECMO can include an antenna that can be used for use in transmission and reception of signals (e.g., Bluetooth signals, NFC signals, RFID signals, etc.).

Figure 11:
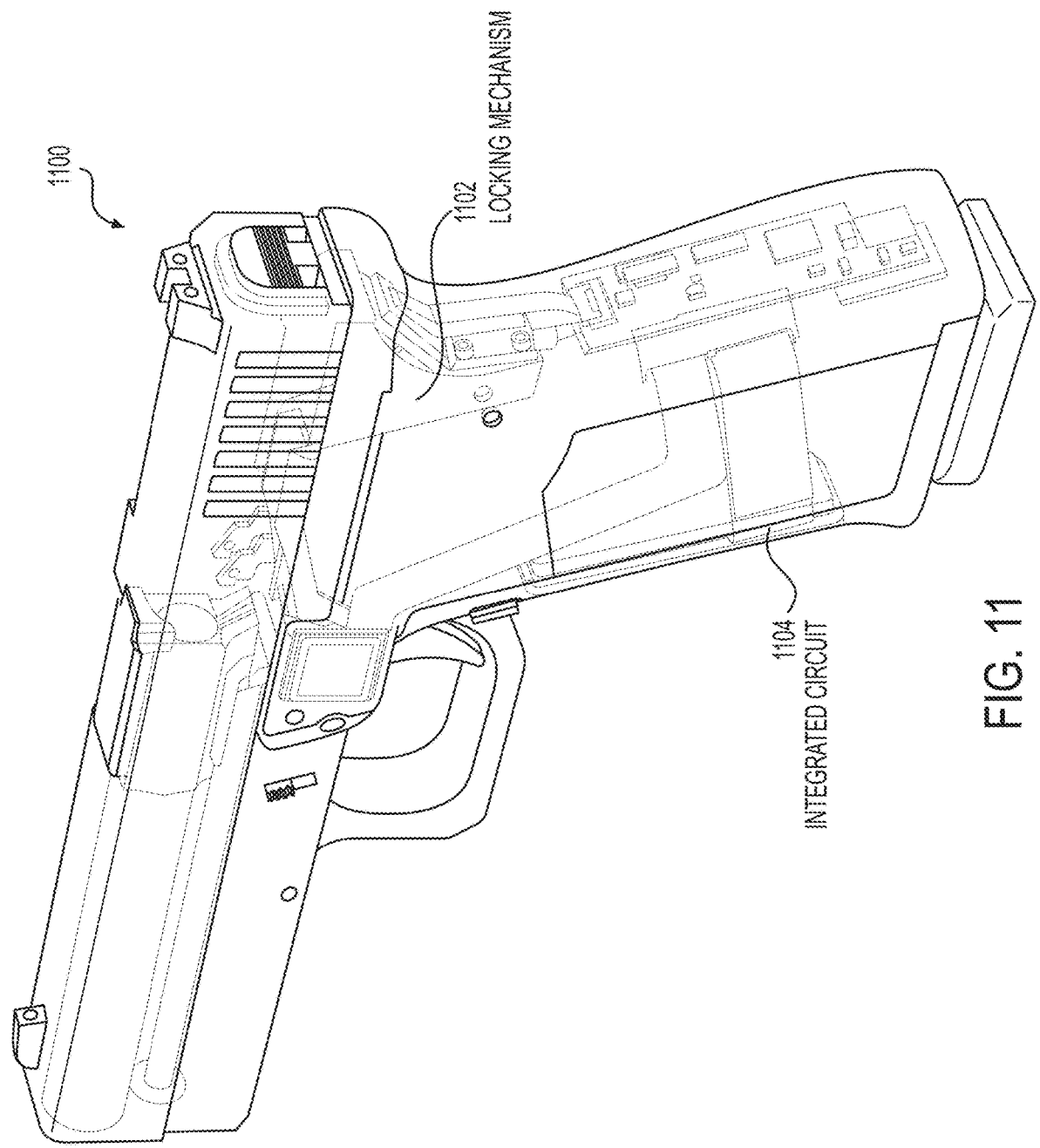
FIG. 11 is a diagram illustrating an example safety system embedded inside a firearm, according to embodiments.

FIG. 11 is a diagram illustrating an example safety system embedded inside a firearm 1100, according to embodiments. As shown in FIG. 11, the safety system is disposed partially within the firearm 1100. A portion of the safety system is in a grip of the firearm 1100. The safety system includes an integrated circuit 1104 disposed on an inner surface of the grip adjacent a trigger of the firearm 1100. The safety system includes a locking mechanism 1102 that is mechanically coupled to a trigger bar of the firearm 1100. As described herein, the locking mechanism may comprise of a trigger bar stop that prevents actuation of a trigger bar of the firearm 1100 when in a locked position. The locking mechanism may allow actuation of the trigger bar (thereby allowing discharging of the firearm) when the locking mechanism is in an unlocked position. The integrated circuit 1104 is configured to control the position of the locking mechanism 1102 by controlling a motor mechanically coupled to a cam that can move the locking mechanism 1102 between locked and unlocked positions.

Figure 13:
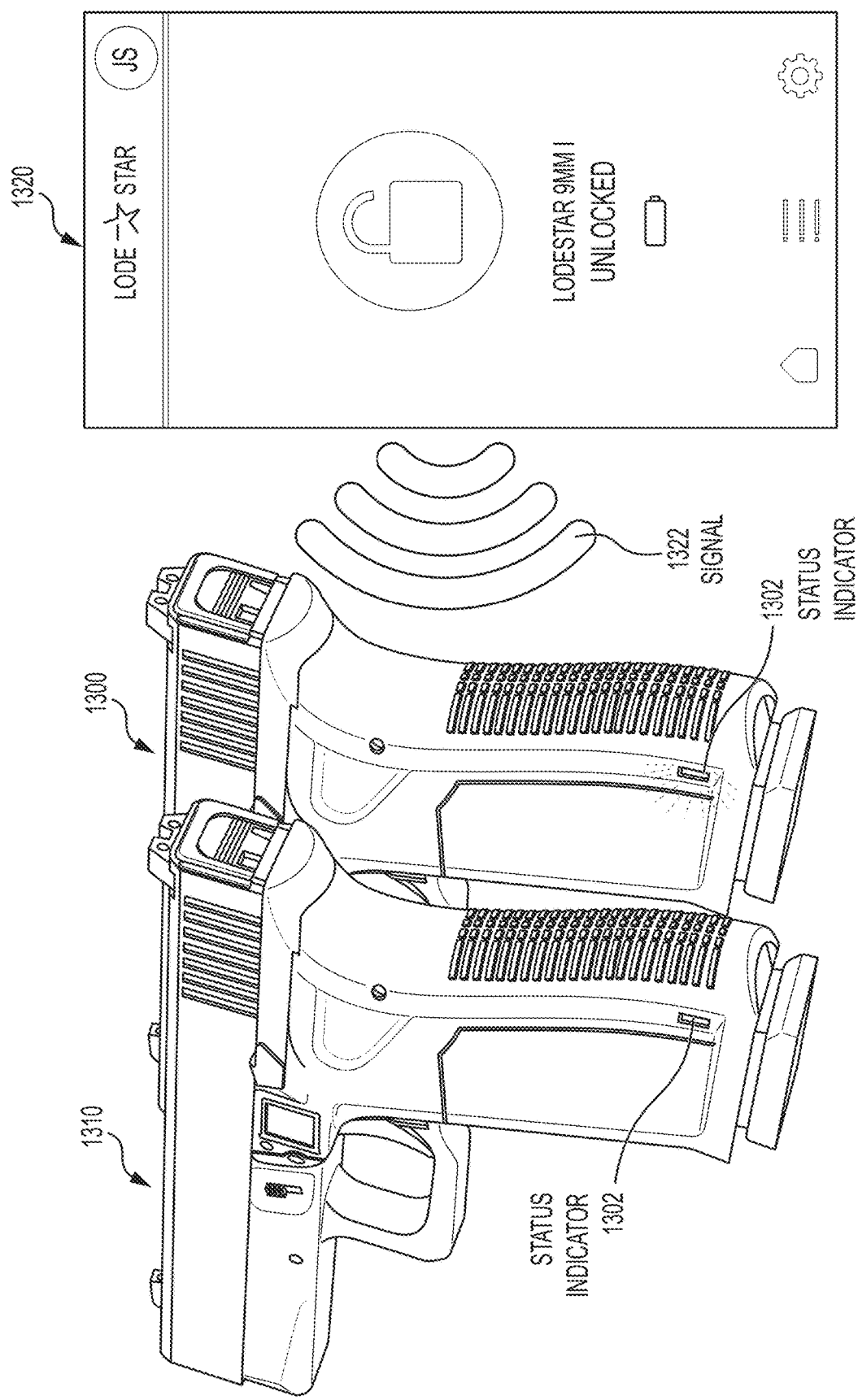
FIG. 13 is a diagram illustrating unlocking of a firearm using a mobile device, according to some embodiments.

In some embodiments, a computer application (e.g., an application on a mobile device, such as a smart phone) can be used to lock and/or unlock the firearm. FIG. 13 is a diagram illustrating unlocking of a firearm using a mobile device 1320, according to some embodiments. As shown in FIG. 13, the mobile device 1320 transmits a signal 1322 (e.g., a Bluetooth signal, an RFID signal, an NFC signal, and/or other suitable signal) to a receiver of the ECMO embedded within the firearm (e.g., through a wireless communication circuit to a processor of the ECMO). Reference number 1300 indicates the firearm prior to being unlocked, and the reference number 1310 indicates the firearm after being unlocked as a result of receiving the signal 1322. In some embodiments, the mobile device 1320 is configured to: (1) receive, through an input interface of the mobile device 1320, authentication information from a user; (2) determine, using the authentication information, whether the user is permitted to use (e.g., fire) the firearm; and (3) transmit the signal 1322 when it is determined that the user is permitted to use the firearm. The authentication information may, for example, include an entered password, a sensed fingerprint, a facial recognition input (e.g., an image of the user's face), a pin, a sliding pattern, and/or other input.

As illustrated in FIG. 13, the mobile device 1320 is configured to display an indication that the firearm is unlocked. For example, the mobile device 1320 may generate a graphical user interface (GUI) in an application indicating that the firearm is unlocked. In some embodiments, the mobile device 1320 is configured to: (1) receive, from the ECMO of the firearm, a signal indicating that the firing mechanism of the firearm has been unlocked; and (2) generate the GUI indicating that the firearm is unlocked in response to receiving the signal indicating that the firing mechanism of the firearm has been unlocked. In some embodiments, the mobile device 1320 is configured to generate the GUI indicating that the firearm is unlocked in response to transmitting the signal 1322 (e.g., without receiving a subsequent signal from an ECMO of the firearm).

As illustrated in FIG. 13, the firearm includes a status indicator 1302. The status indicator 1302 is a light source. The status indicator 1302 emits a first color light (e.g., green) when a firing mechanism is locked (e.g., when an ECMO is in a locked position), as indicated by reference number 1300. The status indicator 1302 emits a second color (e.g., red) different from the first color when the firing mechanism of the firearm is unlocked (e.g., when the ECMO is in an unlocked position), as indicated by reference number 1310. In the example of FIG. 13, the status indicator 1302 comprises a light source located on the grip of the firearm located proximate a base of the grip. In some embodiments, the status indictor 1302 may be located elsewhere on the firearm. It should be appreciated that colors of a status indicator discussed herein are used for illustrative purposes. Some embodiments may use different colors and combinations thereof than those mentioned herein.

Figure 14:
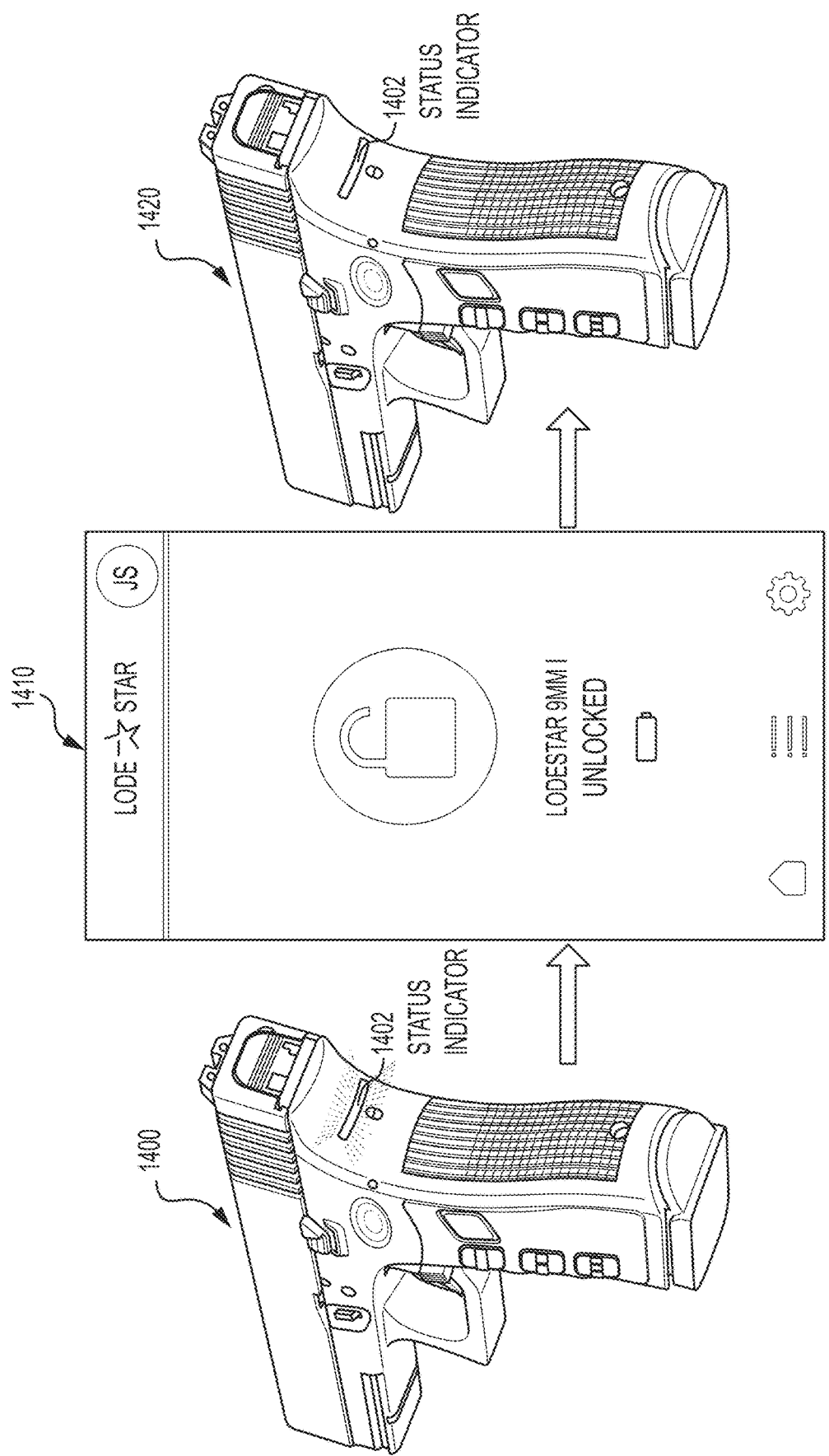
FIG. 14 is another diagram illustrating unlocking of a firearm using a mobile device, according to some embodiments.

FIG. 14 is another diagram illustrating unlocking of a firearm using a mobile device 1410, according to some embodiments. In the example of FIG. 14, the firearm includes a status indicator 1402 on a back surface of the firearm's grip. When a firing mechanism of the firearm is locked (indicated by reference number 1400), the status indicator 1402 emits light of a first color (e.g., green). When the firing mechanism of the firearm is unlocked (indicated by reference number 1410) by a signal from the mobile device 1410, the status indicator emits light of a second color (e.g., red) different from the first color.

Figure 22:
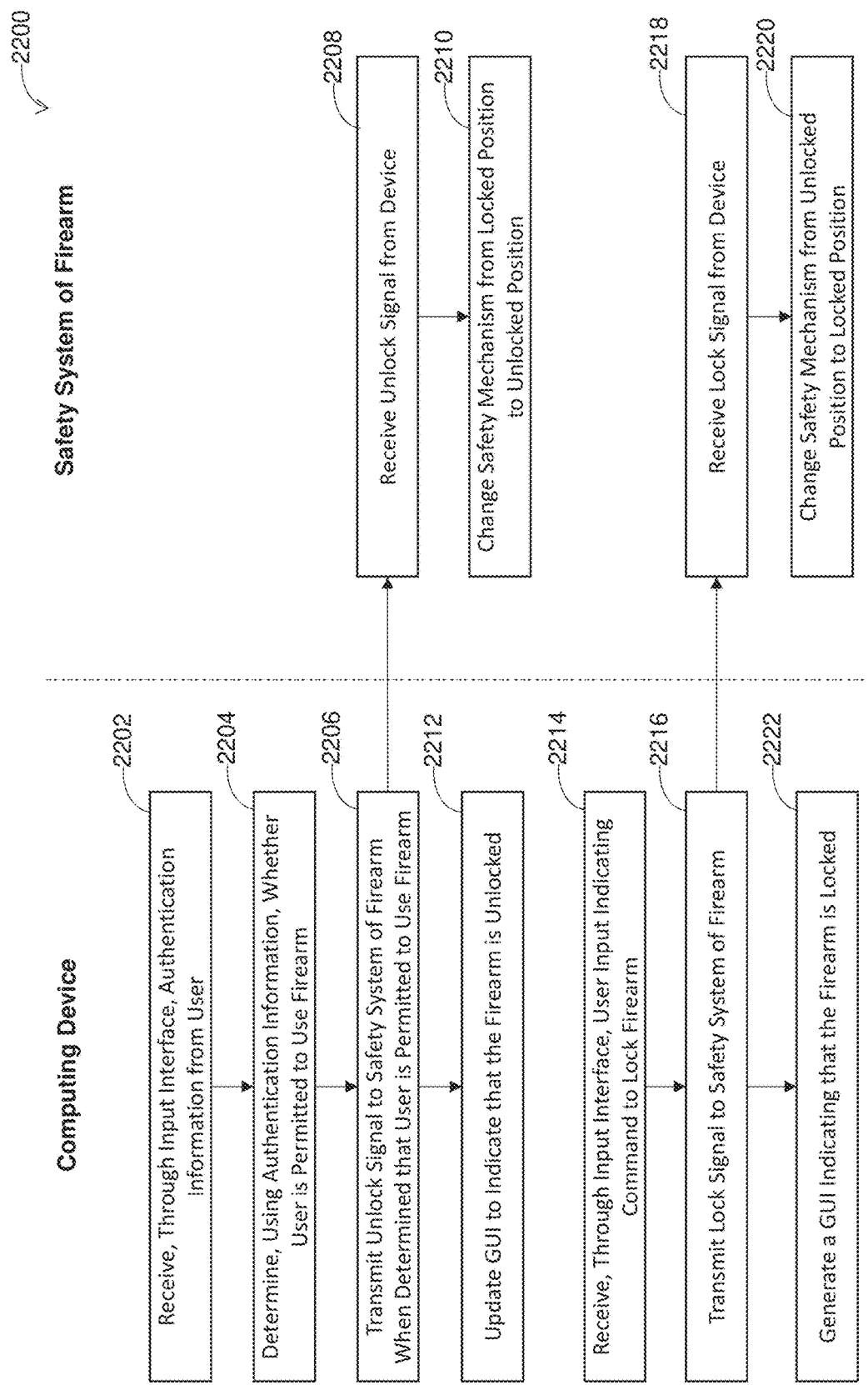
FIG. 22 is a diagram of an example process for unlocking and/or locking a safety system of a firearm using a computing device, according to some embodiments.

FIG. 22 is a diagram of an example process 2200 for unlocking and/or locking a safety system of a firearm using a computing device (e.g., a smartphone), according to some embodiments. Process 2200 may be performed between a computing device such as a mobile device (e.g., a smartphone, smartwatch, tablet, or other mobile device) and a safety system (e.g., an ECMO safety system) of a firearm. As described herein, the safety system may include wireless communication hardware (e.g., a wireless communication circuit) for communicating with the computing device. The safety system may further include a processor (e.g., a microcontroller) for controlling a safety mechanism (e.g., a locking mechanism) of the safety system.

Process 2200 begins at block 2202, where the device receives, through an input interface, authentication information provided by a user. The authentication information may be information that can be used to verify an identity of an identity of the user. For example, the authentication information may be information that uniquely identifies the user and/or information that is only known to the user. In some embodiments, the device may be configured to receive a password or pin entered by the user into a GUI of an application, a fingerprint detected by contacting a portion of a screen of the device, a facial scan image, a voice input and/or other suitable information that may be used to verify an identity of the user.

Next, process 2200 proceeds to block 2204, where the device determines, using the authentication information, whether the user is permitted to use the firearm. The device may be configured to determine whether a user identity indicated by the authentication information belongs to a user permitted to use the firearm. In some embodiments, the device may be configured to compare the authentication information to previously stored authentication information of one or more users permitted to use the firearm. For example, the device may compare a received password, pin, fingerprint scan, facial scan, voice input, received at block 2202 to a stored password, pin, fingerprint scan, facial scan, voice input, or other authentication information of a user permitted to use the firearm to determine whether there is a sufficient match.

Next, process 2200 proceeds to block 2206, where the device transmits an unlock signal (e.g., a Bluetooth signal, NFC signal, RFID signal, or other suitable wireless communication signal) to the safety system of the firearm when it is determined that the user is permitted to user the firearm. For example, the device may transmit the unlock signal when the device determines that the authentication information received at block 2202 sufficiently matches previously stored authentication information of user(s) permitted to use the firearm. If the device determines that the user is not permitted to use the firearm, then the process 2200 may end. In this case, the device may not transmit an unlock signal. In some embodiments, the device may be configured to transmit a signal indicating that the user is not permitted to use the firearm, or that authentication failed.

Next, process 2200 proceeds to block 2208, where the safety system of the firearm receives the unlock signal from the device. For example, the safety system may include a wireless communication circuit through which the safety system receives the unlock signal. Next, process 2200 proceeds to block 2210, where the safety system changes a safety mechanism of the safety system from a locked position to an unlocked position. For example, the safety mechanism may include a trigger bar stop, and the safety system may move the trigger bar stop from a locked position to an unlocked position (e.g., by using a motor to rotate a cam that causes the trigger bar stop to rotate from the locked position to the unlocked position). After changing the safety mechanism from the locked position to the unlocked position, a firing mechanism of the firearm may be unlocked. The user may then be able to pull a trigger of the firearm and fire the weapon.

At block 2212, the device may update a GUI (e.g., of an application) to indicate that a firing mechanism of the firearm is unlocked. Example GUIs are described herein with reference to FIGS. 13-14. In some embodiments, the device may be configured to update the GUI in response to transmitting the unlock signal to the safety system. In some embodiments, the device may be configured to: (1) receive a confirmation signal from the safety system indicating that the firearm has been unlocked; and (2) update the GUI to indicate that the firearm is unlocked in response to receiving the confirmation signal. In some embodiments, the device may be configured to store a record of the unlocking of firearm. For example, the device may store a record of usage of the firearm in memory of the device. The device may add an entry to the record indicating that the firearm was unlocked and a timestamp indicating a time at which the firearm was unlocked.

After unlocking a firearm, a user may decide to lock the firearm (e.g., after a period of use). At block 2214, the device may receive, through an input interface of the device, user input indicating a command to lock the firearm. In some embodiments, the user input may include authentication information (e.g., as described herein with reference to block 2202). In some embodiments, the user input may indicate a command to lock the firearm without including authentication information. The device may thus lock the firearm without requiring authentication.

In some embodiments, the device may be configured to determine whether to allow a user to lock the firearm. For example, the device may use authentication information received at block 2214 to determine whether the user is permitted to use the firearm. If the device determines that the user is permitted to use the firearm, the device may determine that the user is allowed to lock the firearm. Examples of how the device may determine whether a user is permitted to use the firearm are described herein at block 2204.

Next, process 2200 proceeds to block 2216, where the device transmits a lock signal (e.g., a Bluetooth signal, NFC signal, RFID signal, or other wireless communication signal) to the safety system of the firearm. In some embodiments, the device may be configured to transmit the lock signal after it has verified that the user is permitted to use the firearm. In such embodiments, if the device determines that the user is not permitted to use the firearm, the device may not transmit the lock signal.

Next, process 2200 proceeds to block 2218, where the safety system of the firearm receives the lock signal from the device. For example, the safety system may include a wireless communication circuit through which the safety system receives the lock signal. Next, process 2200 proceeds to block 2220 where the safety system changes a safety mechanism from the unlocked position to the locked position (e.g., by using a motor to rotate a cam that causes a trigger bar stop to move from an unlocked position to a locked position of the trigger bar stop). As a result, a firing mechanism of the firearm may be locked thereby preventing firing of the firearm.

At block 2222, the device may update a GUI (e.g., of an application) to indicate that a firing mechanism of the firearm is locked. Example GUIs are described herein with reference to FIGS. 13-14. In some embodiments, the device may be configured to update the GUI in response to transmitting the lock signal to the safety system. In some embodiments, the device may be configured to: (1) receive a confirmation signal from the safety system indicating that the firearm has been locked; and (2) update the GUI to indicate that the firearm is locked in response to receiving the confirmation signal. In some embodiments, the device may be configured to store a record of the locking of firearm. For example, the device may store a record of usage of the firearm in memory of the device. The device may add an entry to the record indicating that the firearm was locked and a timestamp indicating a time at which the firearm was locked.

In some embodiments, the safety system of the firearm may be configured to store a record of usage of the firearm. For example, the safety system may include a black box comprising of memory storing information about usage of the firearm. The safety system may be configured to store a record of locking and unlocking of the firearm. For example, the safety system may store a record indicating times (e.g., timestamps) at which the firearm was locked or unlocked by the safety system. In some embodiments, the safety system may be configured to detect when the firearm is discharged (e.g., by detecting pulling of a trigger of the firearm). The safety system may be configured to store a record of when the firearm was discharged. For example, the safety system may store, in a black box memory, a record of times (e.g., timestamps) at which the firearm was discharged.

Figure 15:
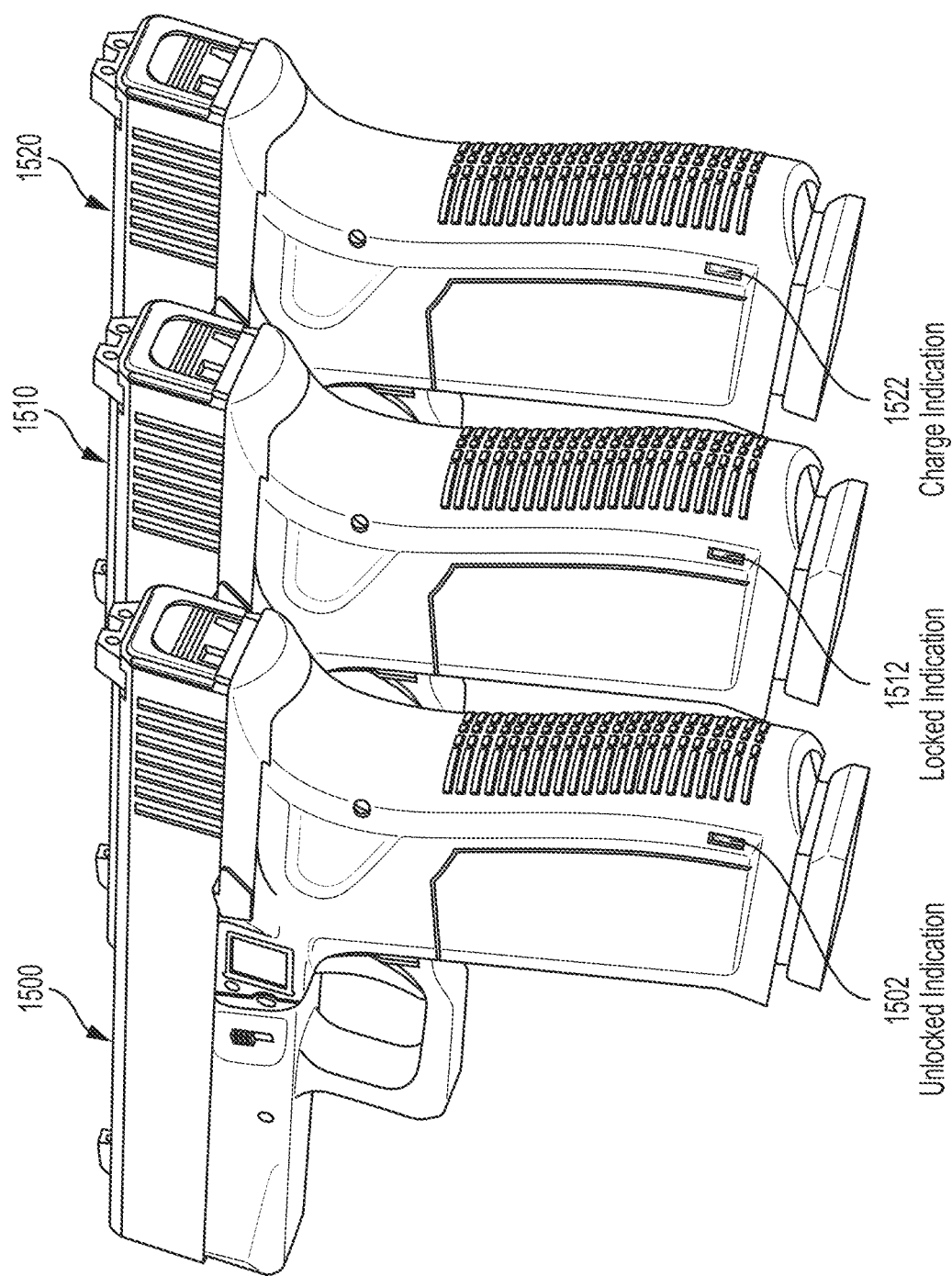
FIG. 15 is a diagram illustrating various example states of a safety system status indicator, according to some embodiments.

In some embodiments, a status indicator of a safety system may have various states indicating respective states of the safety system. For example, the status indicator may have a first state indicating that the safety system is in an unlocked position, a second state indicating that the safety system is in the locked position, a third state indicating that the safety system needs to be charged, a fourth state indicating that the safety system is being charged, and/or other states. FIG. 15 is a diagram illustrating various example states of a safety system status indicator, according to some embodiments. When a firing mechanism of the firearm is unlocked (indicated by reference number 1500), the status indicator 1502 (e.g., a light) is in a first state in which it indicates that the firing mechanism is unlocked. In the example of FIG. 15, the status indicator is emitting a red light to indicate that the firing mechanism is unlocked. When a firing mechanism of the firearm is locked (indicated by reference number 1510), the status indicator is in a second state in which it indicates that the firing mechanism is locked. In the example of FIG. 15, the status indicator is emitting a green light to indicate that the firing mechanism is locked. When the safety system needs to be charged (indicated by reference number 1520), the status indicator is in a third state in which it indicates that the safety system requires charging. In the example of FIG. 15, the safety indicator emits a white light to indicate that the safety system needs to be charged.

Figure 16B:
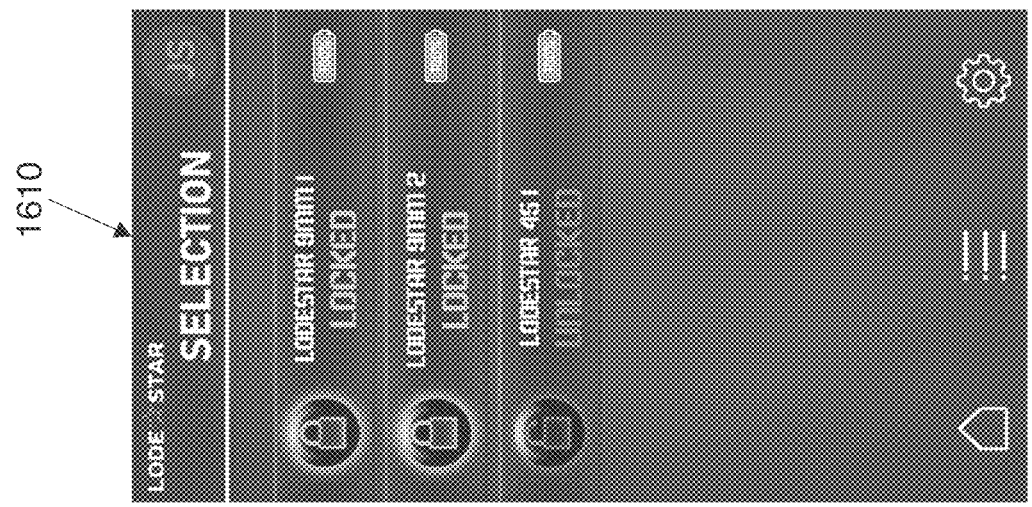
FIG. 16B is a GUI showing a status of the safety system in each firearm, according to some embodiments.
Figure 16A:
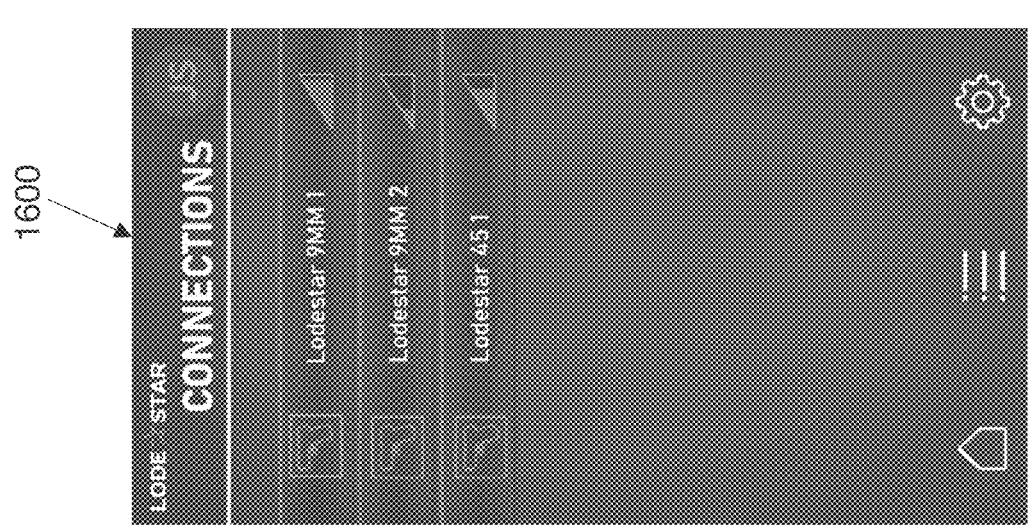
FIG. 16A is a graphical user interface (GUI) displayed on a mobile device showing connections with safety systems of various firearms, according to some embodiments.

In some embodiments, a mobile device may be configured to control safety systems of multiple different firearms. For example, the mobile device may be configured to communicate with a safety system of each firearm as described herein with reference to FIGS. 13-14 and 22. FIG. 16A is a graphical user interface (GUI) 1600 displayed on a mobile device showing connections with safety systems of various firearms. Each of the firearms may have a respective name stored by the device (e.g., as data for an application of the device). In the example of FIG. 16A, the device is connected to three devices: "Lodestar 9MM 1", "Lodestar 9MM 2", and "Lodestar 45 1". For example, the device may have established a Bluetooth connection with safety systems in each of the firearms. FIG. 16B is a GUI 1610 showing a status of the safety system in each firearm. In the example of FIG. 16B, the firing mechanism of firearm "Lodestar 9MM 1" is locked, the firing mechanism of firearm "Lodestar 9MM 2" is locked, and the firing mechanism of firearm "Lodestar 45 1" is unlocked. The GUI 1610 may allow a user to select a graphical element associated with a respective firearm to provide authentication information to lock or unlock the firearm, and/or to view more information about the firearm.

In some embodiments, the mobile device may be configured to display a respective GUI for each of multiple firearms. For example, when the mobile device receives user input (e.g., a touch or tap) indicating selection of one of the firearms shown in FIGS. 16A-16B, the mobile device may display a GUI for the selected firearm. The GUI may display information about the selected firearm. For example, the GUI may display usage information, diagnostic data, settings, and/or other information about the selected firearm. In some embodiments, the GUI may allow the user to configure settings for the firearm (e.g., for an ECMO system of the firearm).

The techniques described herein provide a visual indicator on a target, such as a colored laser site, a colored dot (e.g., a red dot site), a reflex site, and/or the like to visually indicate the state of the firearm (e.g., locked, unlocked, etc.). For example, a laser site can be used that projects a laser or pattern onto the target. The color of the laser, or simply the presence of the laser at all, can be used to indicate the state of the firearm. For example, if the firearm is locked, the laser can be off and/or project a color that indicates the firearm is locked (e.g., red or green). Once the firearm is unlocked, the laser site can be turned on (e.g., a red laser site can appear), and/or the color of the laser site can change (e.g., from red to green, or vice versus). As another example, a reflex site can be used that includes a reticle used to aim at the target. The presence of the reticle can be used to indicate whether the firearm is locked. For example, if the firearm is locked, then no reticle is present and/or the reticle can be displayed in a color that indicates the firearm is locked. If the firearm is unlocked, then the reticle can be present and/or the color can be changed to a color that indicates the firearm is active. A separate power source can be used for the visual indicator, and/or the visual indicator can share the same power source used for the ECMO safety. As described herein, in some embodiments the firearm can include a recharge port that can be used to recharge the power source(s) of the firearm, which can include a recharge port for the power source of the laser.

Figure 4:
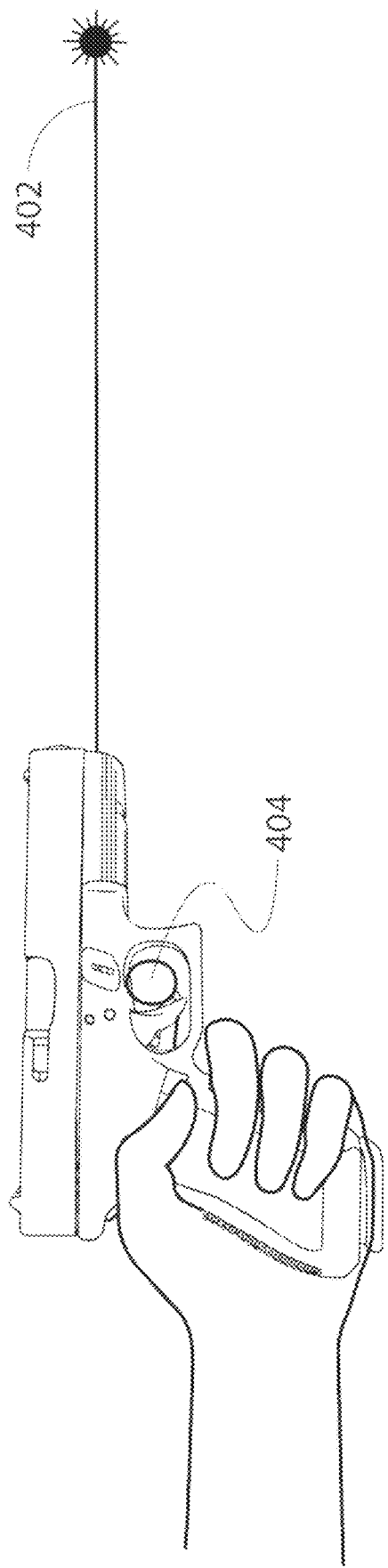
FIG. 4 is a diagram showing an example of a visual indicator that can be used in conjunction with an electrically controlled, mechanically operated safety, according to some embodiments.

FIG. 4 is a diagram showing an example of a visual indicator that can be used in conjunction with an electrically controlled, mechanically operated safety, according to some embodiments. In the example of FIG. 4, the visual indicator is mounted under the barrel of the firearm and arranged such that a laser 402 is projected from the firearm (e.g., onto a target). The laser 402 can be used to indicate the state of the firearm, as described herein. In some embodiments, the laser 402 can be used to indicate other aspects of the firearm, such as when an operator's finger is placed into the trigger guard, as shown by location 404.

Figure 5:
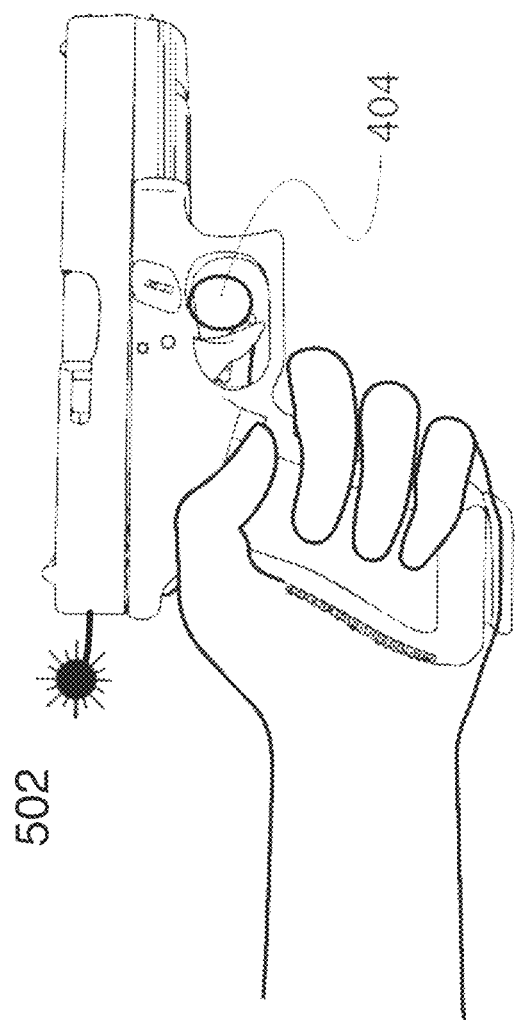
FIG. 5 is a diagram showing an example of a visual indicator of the firearms status to aid the user, according to some embodiments.

In some embodiments, after the ECMO safety is activated (e.g., by authenticating a user to the firearm and engaging the safety mechanism), other visual indicators can be activated to alert the user that the firearm is ready to shoot. FIG. 5 is a diagram showing an example of a visual indicator 502 (e.g., a colored light) of the firearm to indicate the firearm status to aid the user, according to some embodiments. As described herein, the visual indicator 502 the visual indicator 502 is electrically controlled, such that the visual indicator can be turned on and off based on the ECMO safety, an authentication process, a user placing their index finger in the trigger guard, and/or the like. Such a visual indicator can have one or more advantages over existing techniques. For example, compared to colored lights on a firearm, the laser sight techniques described herein are instinctive because having a laser (or dot) appear where round will impact is easier to understand than a light in the user's field of view. The techniques described herein can also save power and extend battery life. For example, as described herein some embodiments do not activate the laser site until the firearm is ready to shoot, which can save power compared to systems that always illuminate a light on the firearm. In some embodiments, colored lights can be used to indicate aspects of the firearm, such as battery state (e.g., different color lights to indicate full battery, low battery, dead battery, etc.), whether the firearm has malfunctioned, etc.

As another example, the techniques described herein can force users to use laser sites, which can help improve gun safety. For example, current data suggests that only approximately 13% percent of rounds fired by police officers in the field actually hit the intended target. This low percentage can be caused by the gun being fired before proper sight alignment through the iron sights. Using a laser site can help improve this percentage.

As a further example, the techniques can be used to alert a user to other aspects of the firearm (e.g., other than simply whether the firearm is ready to shoot), which can help improve gun safety. For example, as described in conjunction with FIG. 4, the techniques can be used to alert users when they have their finger in the trigger guard 404. Such additional indicators can be used to present real-time indicators of the user's operation of the firearm, which can help reduce the number of firearm accidents.

Figure 17:
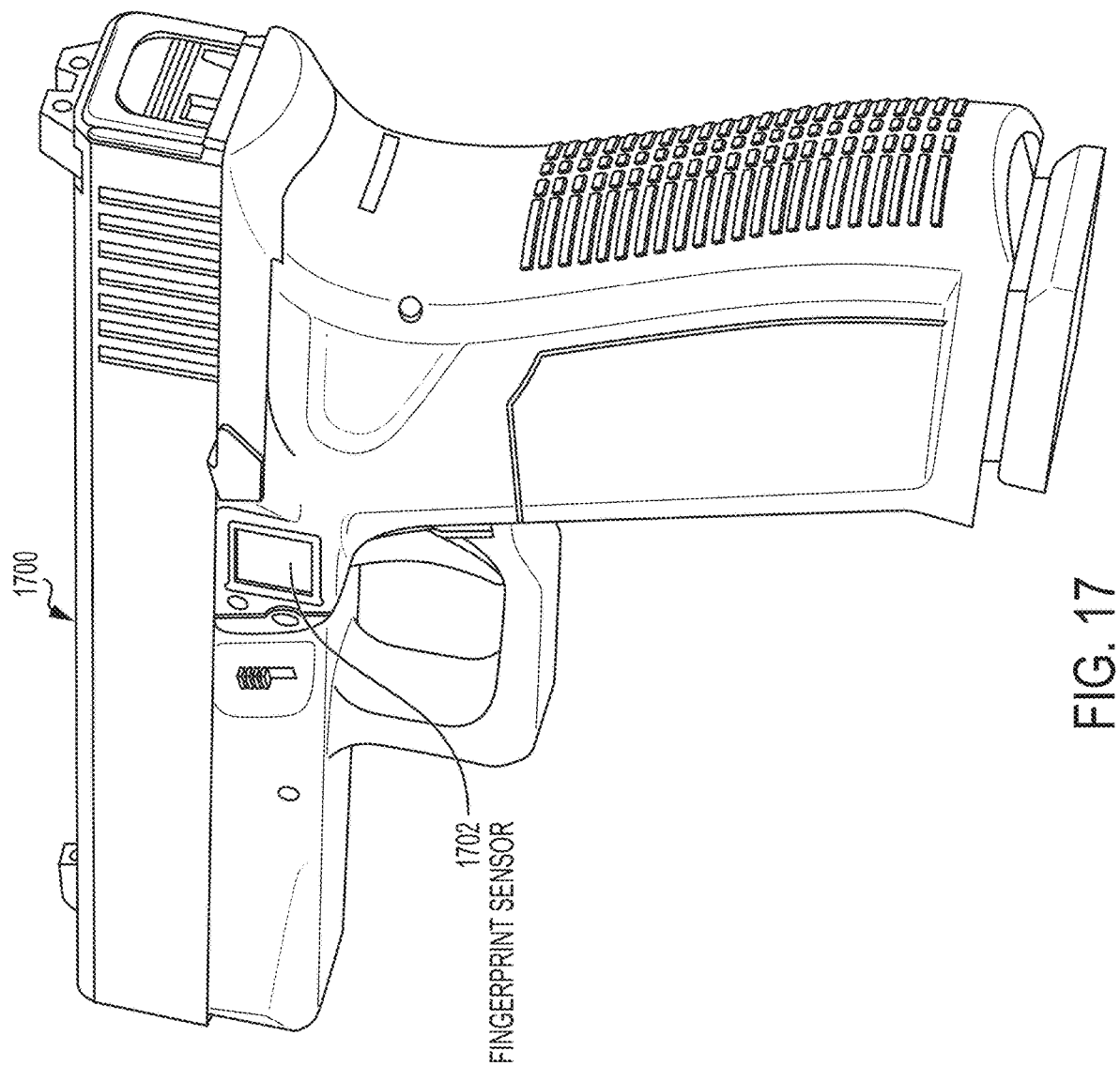
FIG. 17 is a firearm with a fingerprint scanner for locking and unlocking the firearm, according to some embodiments.

In some embodiments, one or more sensors of the firearm can include a light source. Such a light source can, for example, make it easier for a user to locate aspects of the safety mechanism to lock or unlock the firearm (e.g., in a dark room, at night, etc.). FIG. 17 is a firearm 1700 with a fingerprint sensor 1702 for locking and unlocking the firearm, according to some embodiments. In some embodiments, the fingerprint sensor 1702 may be a component of a safety system. The fingerprint sensor 1702 may be electronically coupled to a circuit (e.g., a PCB) of the safety system such that an electrical signal generated by the fingerprint sensor 1702 may be used to authenticate a user of the firearm 1700. In some embodiments, the fingerprint sensor 1702 may comprise a grid of capacitors that discharge in response to contact by ridges of a finger contacting the fingerprint sensor 1702. An electrical signal generated from discharging of the capacitors may be used to authenticate a user of the firearm 1700. In some embodiments, the fingerprint sensor 1702 may be an optical sensor that captures an optical scan (e.g., an image) of a finger contacting the fingerprint sensor 1702. The optical scan may be used by a processor of the safety system to determine whether to unlock the firearm 1700. In some embodiments, the fingerprint sensor 1702 may be an ultrasonic sensor that transmits an ultrasonic pulse to the fingerprint sensor 1702 and detects a returning ultrasonic pulse to generate a scan of a finger contacting the fingerprint sensor 1702. The scan of the finger may then be used by a processor of the safety system to determine whether to unlock the firearm 1700.

In some embodiments, a safety system may be configured to store one or more fingerprint scans of one or more users permitted to use the firearm 1700. The safety system may be configured to determine whether to unlock a firing mechanism of the firearm 1700 by comparing a fingerprint scan obtained by the fingerprint sensor 1702 to the stored fingerprint scan(s). When the safety system determines that the obtained fingerprint scan matches a stored fingerprint scan of a user with permission to use the firearm 1700, the safety system may unlock a firing mechanism of the firearm 1700 (e.g., by moving a safety mechanism from a locked position to an unlocked position).

In some embodiments, a fingerprint sensor of a firearm may include a light source. The light source may illuminate the fingerprint sensor such that a user may recognize a location of the fingerprint sensor on the firearm in conditions where there is insufficient light for the user to discern the location of the fingerprint sensor without any such illumination. In some embodiments, the light source may emit light without requiring a light source. For example, the light source may be a luminescent material comprising a phosphor that emits absorbed energy as light. The luminescent material may be a phosphorescent material that discharges previously absorbed light. In some embodiments, the light source may be a light-emitting diode (LED).

Figure 18:
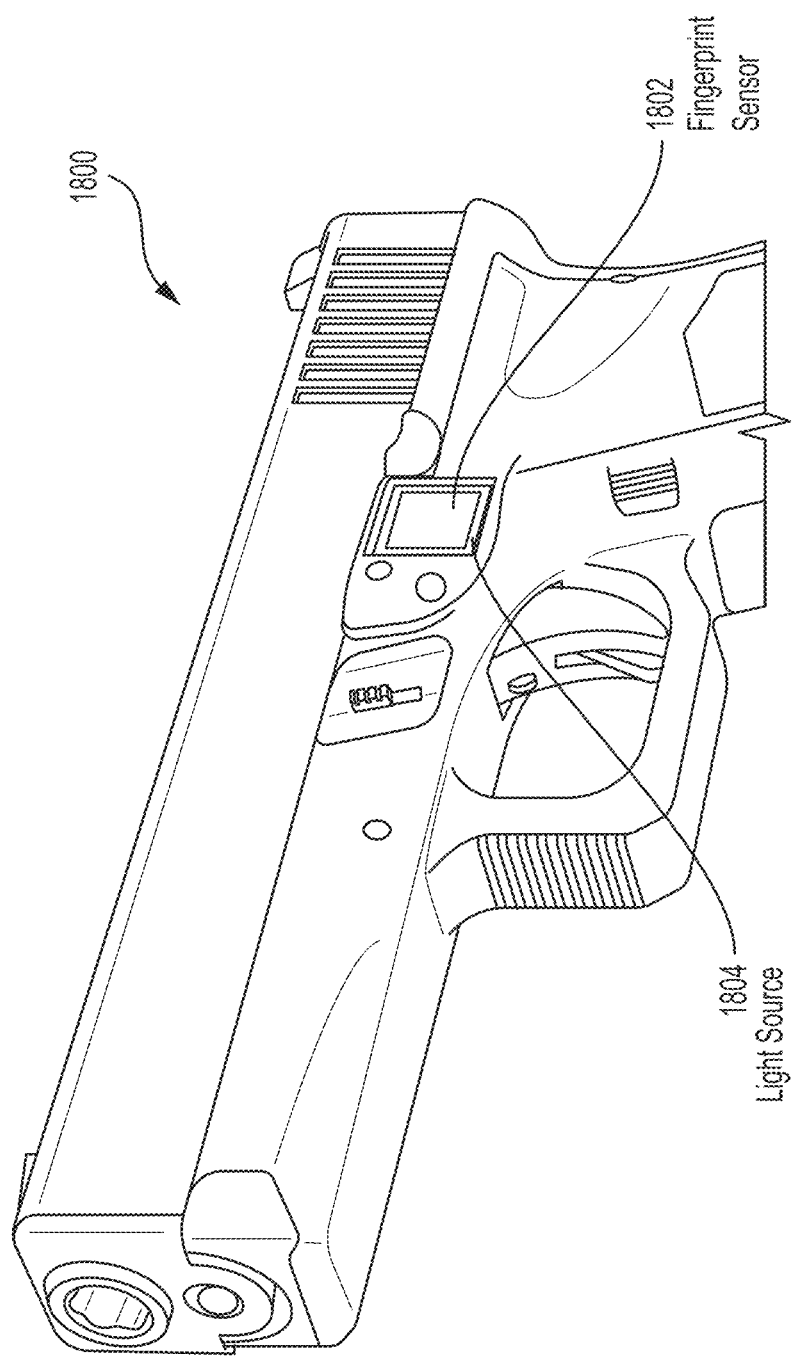
FIG. 18 is a diagram of a firearm including a fingerprint sensor and a light source associated with the fingerprint sensor, according to some embodiments.

FIG. 18 is a diagram of a firearm 1800 including a fingerprint sensor 1802 and a light source 1804 associated with the fingerprint sensor, according to some embodiments. As shown in FIG. 18, the light source 1804 illuminates an outer boundary of the fingerprint sensor 1802 on the firearm 1800. The illumination by the light source 1804 may allow a user of the firearm 1800 to easily locate the fingerprint sensor 1802 thereby allowing the user to place a finger on the fingerprint sensor 1802 to lock or unlock a firing mechanism of the firearm 1800.

In some embodiments, components of an ECMO safety system may be powered by electrical energy. The ECMO system may include a battery storing electrical energy that can be used to power components of the ECMO system. For example, a motor of the ECMO system may use battery power to rotate a cam. As another example, a processor of the ECMO may be powered by the battery. As another example, wireless communication hardware may be powered by the battery. In some embodiments, the battery may be a rechargeable battery. The ECMO system may include hardware to recharge the battery. The ECMO system may include a charging element that is configured to make an electrical connection with a charger (e.g., a charging station) that provides electrical energy to recharge the battery.

Figure 19A:
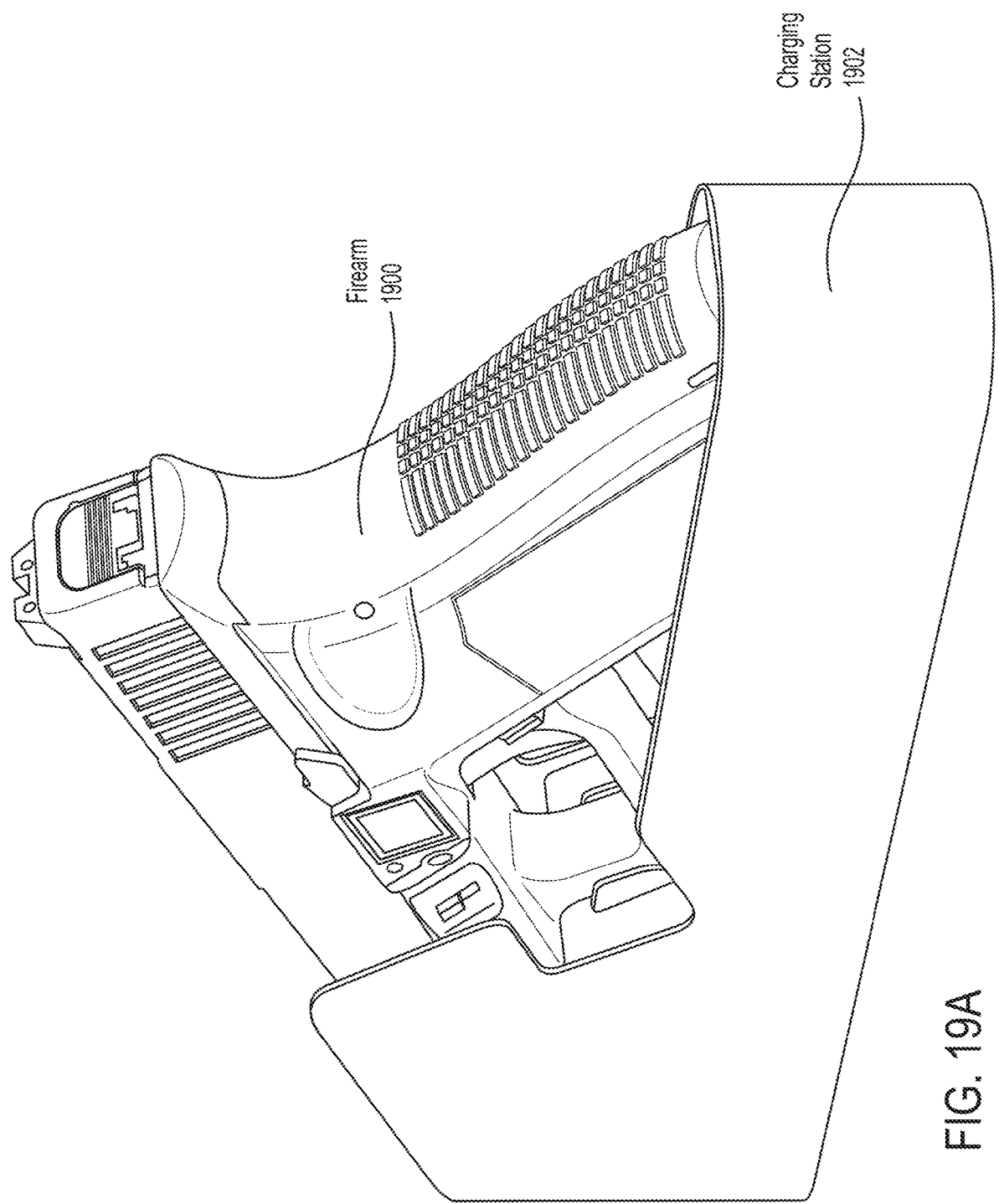
FIG. 19A is a firearm placed in a charging station, according to some embodiments.

FIG. 19A is a firearm 1900 placed in a charging station 1902, according to some embodiments. In the example embodiment of FIG. 19A, the charging station 1902 is a charging dock into which the firearm 1900 is placed. As shown in FIG. 19A, a portion of the barrel of the firearm, a portion of the trigger, and a portion of the base of the handle of the firearm 1900 rest in the charging station 1902 in a manner that keeps the firearm propped upwards for easy insertion and removal by a user. The firearm may include a charging element that makes an electrical connection with the charging station 1902 for transmission of an electrical current. The charging element may comprise one or more electrical contact pins or one or more stubs that make an electrical connection with the charging station 1902 when placed in contact with a corresponding contact (e.g., pin(s) or stub(s)) of the charging station 1902. A battery of the EMCO safety system of the firearm 1900 may thus be charged by an electrical current flowing through the electrical connection.

Figure 19C:
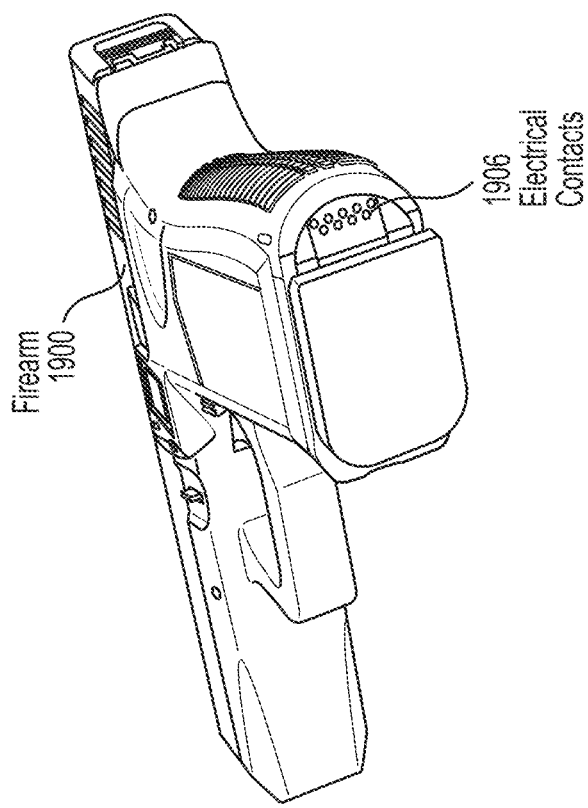
FIG. 19C is a view of a base of a grip of the firearm of FIGS. 19A-19B, according to some embodiments.
Figure 19B:
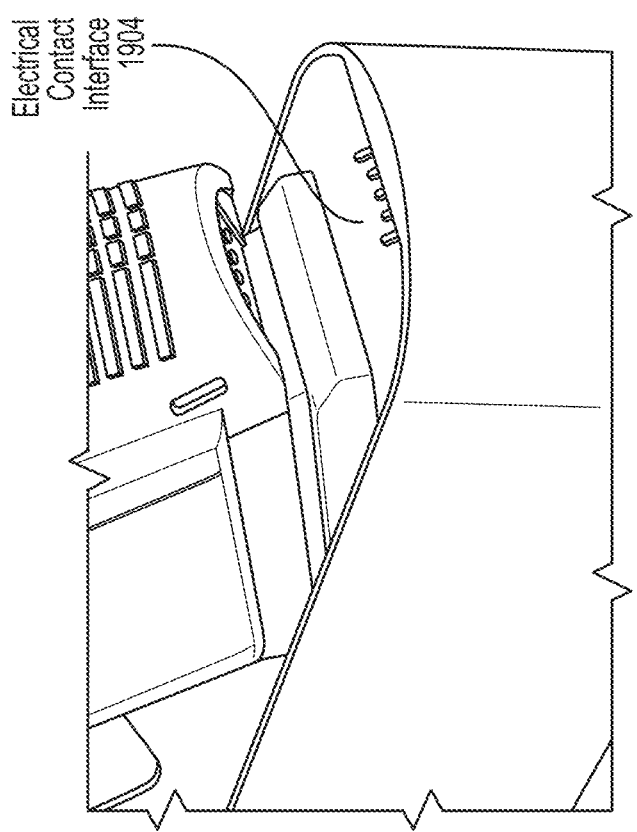
FIG. 19B is a closeup of an electrical contact interface between the firearm and the charging station of FIG. 19A, according to some embodiments.

FIG. 19B is a closeup view of the electrical contact interface 1904 between the firearm 1900 and the charging station 1902. The electrical contact interface 1904 shows contact pins of the charging station 1902 that make an electrical connection with a corresponding charging element of the firearm 1900. FIG. 19C is a view of a base of the grip of the firearm 1900. The firearm 1900 includes electrical contacts 1906 that form an electrical connection with corresponding contacts of the charging station 1902 when the firearm 1900 is placed therein. In the example of FIG. 19B, the electrical contacts 1906 are stubs configured to make contact with pins of the charging station 1902. In some embodiments, the electrical contacts 1906 may be pins (e.g., that may be inserted into slots of the charging station 1902). As shown in FIG. 19C, the electrical contacts can be located at the bottom of the grip towards the back of the grip, such that the magazine may (or may not) be loaded in the firearm 1900 without interfering with charging.

Figure 20A:
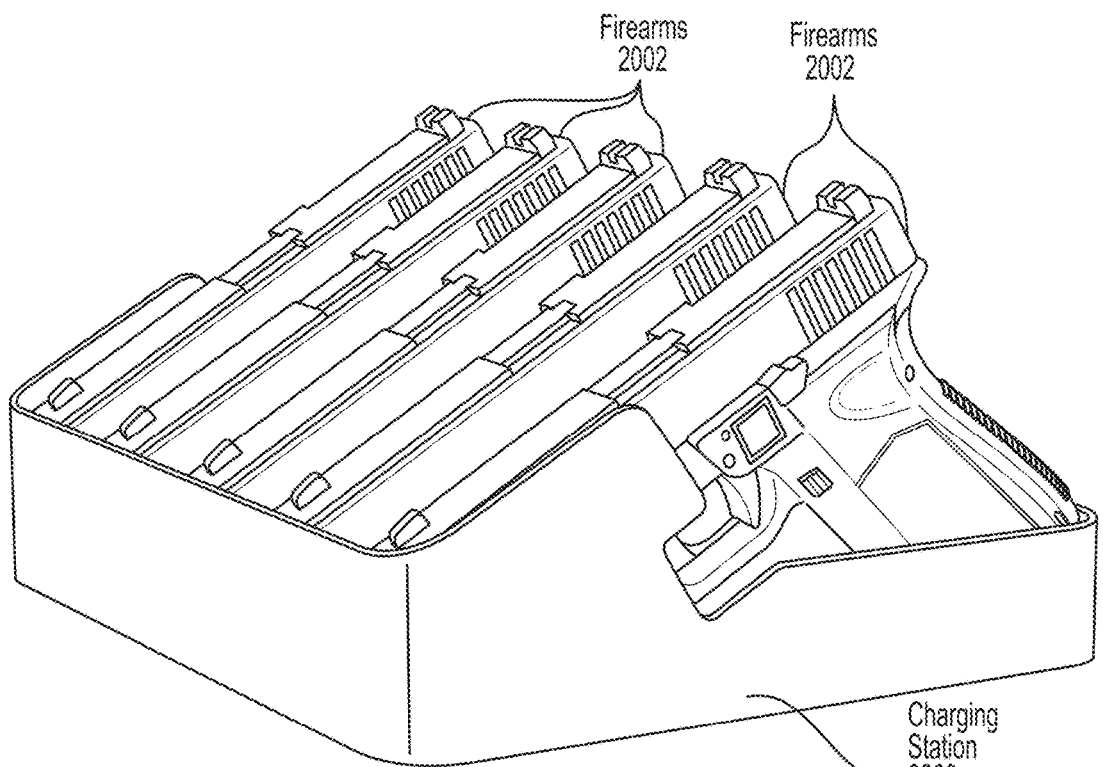
FIGS. 20A-20B is a charging station for charging safety systems of multiple firearms, according to some embodiments.
Figure 20B:
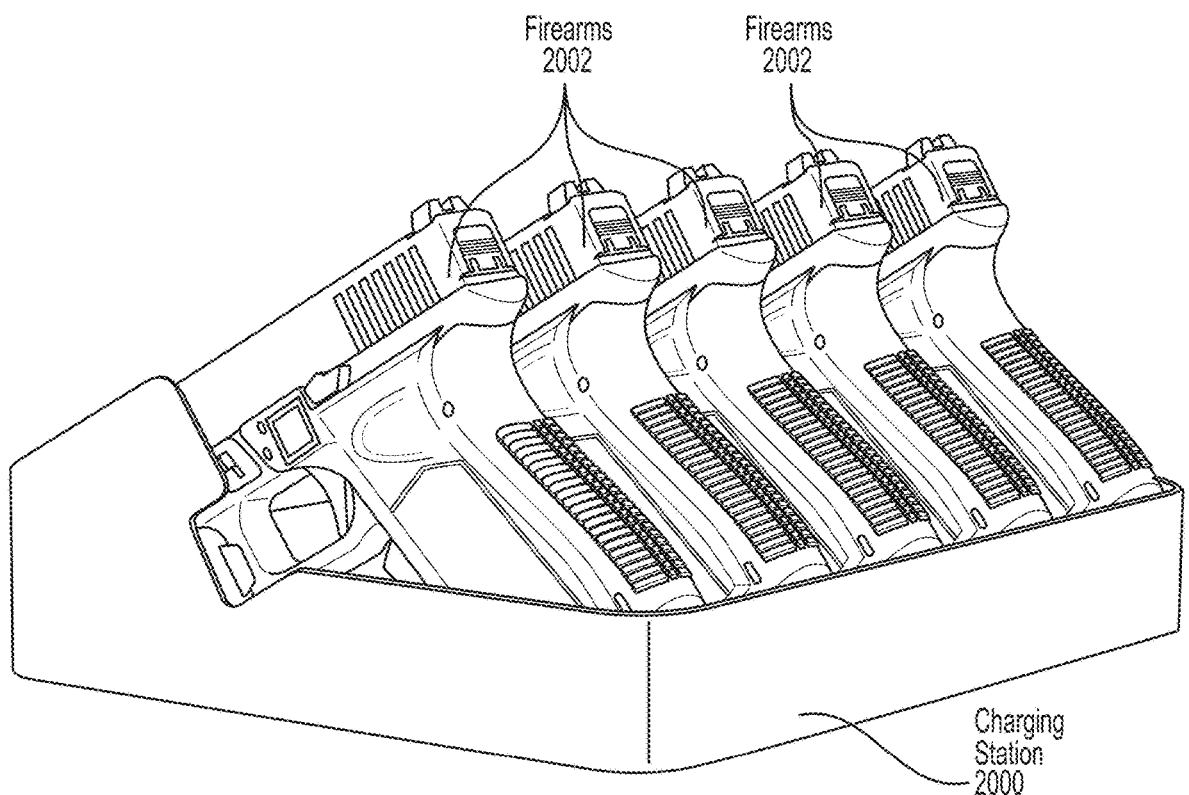

In some embodiments, a charging station may be configured to charge ECMO safety systems of multiple firearms simultaneously. The charging station may allow multiple firearms to be placed in the charging station such that batteries within the firearms can be charged. FIGS. 20A-20C show a charging station 2000 that can charge multiple firearms 2002 simultaneously. As shown in FIGS. 20A-20B, the firearms 2002 may be placed in adjacent one another in the charging station 2000. Each of the firearms 2002 may include a charging element (e.g., pin(s) or stub(s)) that make an electrical connection with a corresponding contact (e.g., stub(s), slot(s) or pin(s)) of the charging station 2000. A battery of each firearm may then be charged by an electrical current received through the electrical connection.

Figure 21A:
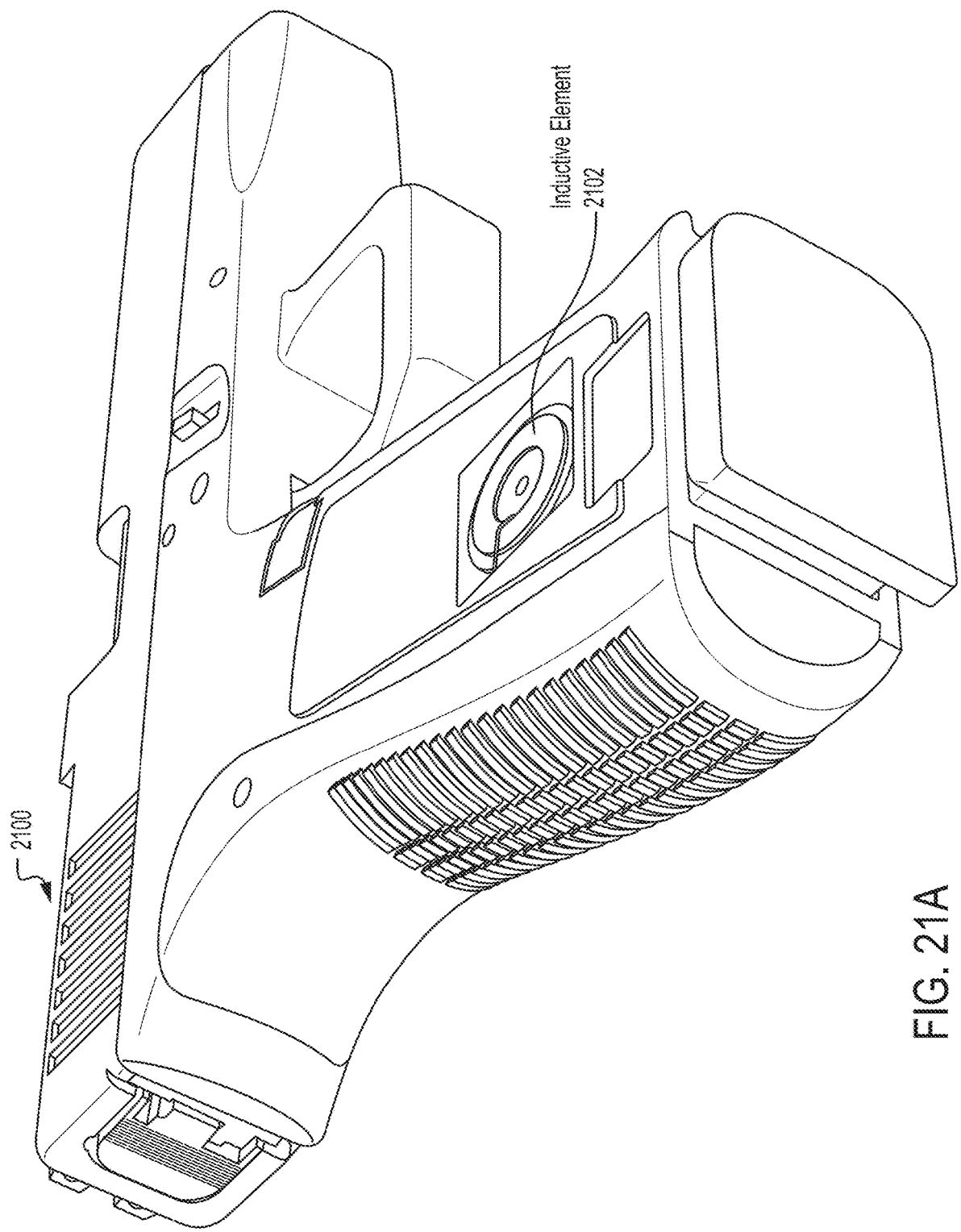
FIG. 21A is a firearm including an inductive charging element, according to some embodiments.
Figure 21C:
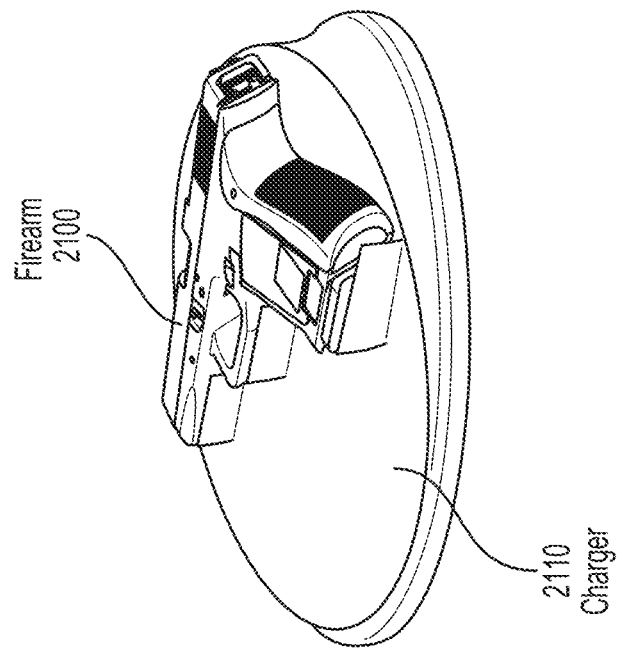
FIG. 21C shows the firearm of FIG. 21A placed on the charging station of FIG. 21B for charging, according to some embodiments.
Figure 21B:
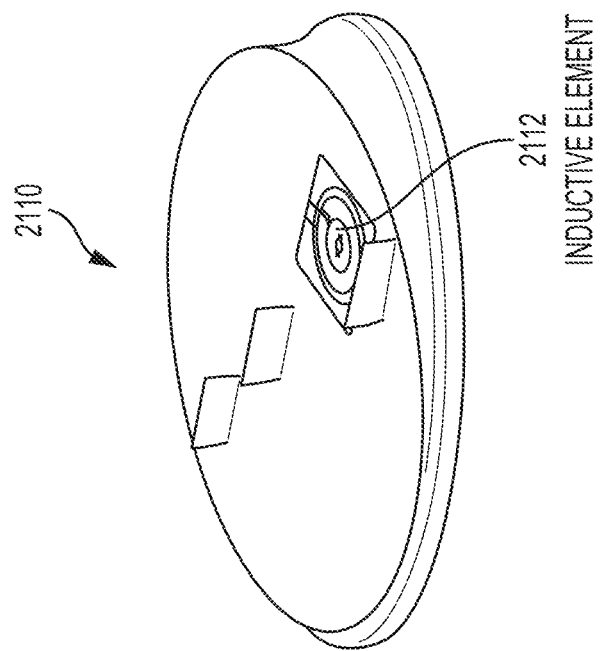
FIG. 21B is a charging station for charging the firearm of FIG. 21A, according to some embodiments.

FIG. 21A is a firearm 2100 including an inductive charging element 2102. The inductive charging element 2102 may make an electrical connection with a corresponding inductive element of a charger. FIG. 21B shows an inductive charger 2110 including an inductive conduct element 2112 that makes an electrical connection with the charging element 2102 of the firearm 2100. In some embodiments, the inductive elements 2102, 2112 may make a wireless electrical connection when the firearm 2100 is placed on the charger 2110. Power may be transferred between the inductive elements 2102, 2112 is transferred to through electromagnetic induction. A battery of an ECMO safety system of the firearm 2100 may be charged by an electrical current generated through the electromagnetic induction. FIG. 21C shows the firearm 2100 placed on the charger 2110 such that the inductive charging elements 2102 of the firearm 2100 makes an electrical connection with the inductive element 2112 of the charger 2110.

The various methods or processes outlined herein may be coded as software that is executable on one or more processors that employ any one of a variety of operating systems or platforms. Additionally, such software may be written using any of numerous suitable programming languages and/or programming or scripting tools, and also may be compiled as executable machine language code or intermediate code that is executed on a virtual machine or a suitable framework.

In this respect, various inventive concepts may be embodied as at least one non-transitory computer readable storage medium (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, implement the various embodiments of the present invention. The non-transitory computer-readable medium or media may be transportable, such that the program or programs stored thereon may be loaded onto any computer resource to implement various aspects of the present invention as discussed above.

The terms "program," "software," and/or "application" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion among different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in non-transitory computer-readable storage media in any suitable form. Data structures may have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the description provided herein be regarded as including such equivalent constructions insofar as they do not depart from the spirit and scope of the disclosed subject matter.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The word "exemplary" is used herein to mean serving as an example, instance, or illustration. Any embodiment, implementation, process, feature, etc. described herein as exemplary should therefore be understood to be an illustrative example and should not be understood to be a preferred or advantageous example unless otherwise indicated.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

What is claimed is:

1. An electronically controlled mechanically operated (ECMO) firearm safety system embedded inside a firearm, the system comprising:
   a cam;
   a motor mechanically coupled to the cam, the motor configured to rotate the cam; and
   a trigger bar stop comprising a corner, the trigger bar stop having a first position in which the trigger bar stop prevents firing of the firearm and a second position in which the trigger bar stop allows discharging of the firearm;
   wherein:
      the cam is configured to move the trigger bar stop between the first position and the second position;
      the corner fits within a recess of the cam when the trigger bar stop is in the first position; and
      the corner is outside of the cam when the trigger bar stop is in the second position.

2. The system of claim 1, wherein when the trigger bar stop is in the first position:
   a portion of the trigger bar stop is engaged with a trigger bar of the firearm and prevents movement of the trigger bar in a lateral direction to trigger discharging of the firearm.

3. The system of claim 2, wherein when the trigger bar stop is in the second position:
   the portion of the trigger bar stop is disengaged from the trigger bar of the firearm allowing the trigger bar to move in the lateral direction to trigger discharging of the firearm.

4. The system of claim 1, wherein:
   the trigger bar stop comprises a pivot point; and
   the trigger bar stop rotates about the pivot point when changing between the first position and the second position.

5. The system of claim 4, wherein rotation of the cam by the motor causes rotation of the trigger bar stop about the pivot point.

6. The system of claim 1, wherein the trigger bar stop prevents discharging of the firearm when the trigger bar stop is in the first position by preventing actuation of a firing pin of the firearm.

7. The system of claim 1, further comprising a screw that mechanically couples the motor to the cam.

8. The system of claim 1, further comprising:
   a printed circuit board (PCB) electrically coupled to the motor.

9. The system of claim 8, wherein the PCB is a flexible PCB.

10. The system of claim 8, wherein the PCB comprises a control circuit configured to control the motor.

11. The system of claim 8, wherein the PCB comprises a wireless communication circuit configured to communicate with at least one device.

12. The system of claim 1, further comprising:
   a battery; and
   an electrical connector configured to make an electrical connection with a charger to charge the battery.

13. The system of claim 12, wherein the charger comprises an inductive charger, and the electrical connector comprises an inductive contact configured to make an electrical connection with the inductive charger.

14. The system of claim 12, wherein the electrical connector comprises one or more pins configured to make an electrical connection with one or more electrical contacts of the charger.

15. The system of claim 12, wherein the electrical connector is located on a base of a handle of the firearm.

16. The system of claim 12, wherein the electrical connector is located on a side surface of a handle of the firearm.

17. A firearm comprising:
   a trigger bar configured to move in a first direction to trigger discharging of the firearm;
   a cam comprising a recess;
   a motor mechanically coupled to the cam; and
   a trigger bar stop comprising a corner, the trigger bar stop having a first position in which the trigger bar stop prevents discharging of the firearm and a second position in which the trigger bar stop allows firing of the firearm, wherein:
      the corner of the trigger bar stop fits into the recess of the cam when the trigger bar stop is in the first position; and
      the corner of the trigger bar stop is outside of the recess of the cam when the trigger bar stop is in the second position.

18. The firearm of claim 17, wherein rotation of the cam causes rotation of the trigger bar stop between the first position and the second position.

19. The firearm of claim 17, wherein, when the trigger bar stop is in the first position, the trigger bar stop is engaged with the trigger bar preventing actuation of the trigger bar in the first direction.

20. The firearm of claim 17, wherein, when the trigger bar stop is in the second position, the trigger bar stop is disengaged from the trigger bar allowing actuation of the trigger bar in the first direction.

21. The firearm of claim 17, wherein the cam and the motor are disposed at least partially in a handle of the firearm.

* * * * *